US011908058B2

(12) United States Patent
Anderson et al.

(10) Patent No.: US 11,908,058 B2
(45) Date of Patent: Feb. 20, 2024

(54) CHARACTER ANIMATIONS IN A VIRTUAL ENVIRONMENT BASED ON RECONSTRUCTED THREE-DIMENSIONAL MOTION DATA

(71) Applicant: Autodesk, Inc., San Francisco, CA (US)

(72) Inventors: Fraser Anderson, Newmarket (CA); George William Fitzmaurice, Toronto (CA); Cheng Yao Wang, Ithaca, NY (US); Qian Zhou, Toronto (CA)

(73) Assignee: Autodesk, Inc., San Francisco, CA (US)

( * ) Notice: Subject to any disclaimer, the term of this patent is extended or adjusted under 35 U.S.C. 154(b) by 67 days.

(21) Appl. No.: 17/673,403

(22) Filed: Feb. 16, 2022

(65) Prior Publication Data

US 2023/0260183 A1    Aug. 17, 2023

(51) Int. Cl.
*G06T 13/40* (2011.01)
*G06F 3/01* (2006.01)
*G06F 16/74* (2019.01)
*G06T 7/246* (2017.01)

(52) U.S. Cl.
CPC .............. *G06T 13/40* (2013.01); *G06F 3/011* (2013.01); *G06F 16/743* (2019.01); *G06T 7/251* (2017.01); *G06T 2200/24* (2013.01)

(58) Field of Classification Search
CPC ..... G06T 13/40; G06T 7/251; G06T 2200/24; G06F 16/743; G06F 3/011
See application file for complete search history.

(56) References Cited

U.S. PATENT DOCUMENTS 6,552,729 B1 *  4/2003  Di Bernardo ........... G06T 13/20
                                                    345/473
8,094,156 B2 *  1/2012  Smith ..................... G06T 13/40
                                                    345/949

(Continued)

OTHER PUBLICATIONS

Nguyen, Lan Thao, et al. ("Automatic generation of a 3D sign language avatar on AR glasses given 2D videos of human signers." Proceedings of the 1st International Workshop on Automatic Translation for Signed and Spoken Languages (AT4SSL). 2021.) (Year: 2021).*

(Continued)

*Primary Examiner* — Yu Chen
(74) *Attorney, Agent, or Firm* — Fish & Richardson P.C.

(57) ABSTRACT

Methods, systems, and apparatus, including medium-encoded computer program products, for providing editable keyframe-based animation data for applying to a character to animate motion of the character in three-dimensional space. Three-dimensional motion data is constructed from two-dimensional videos. The three-dimensional motion data represents movement of people in the two-dimensional videos and includes, for each person, a root of a three-dimensional skeleton of the person. The three-dimensional skeleton comprises multiple three-dimensional poses of the person during at least a portion of frames of a video from the two-dimensional videos. The three-dimensional motion data is converted into editable keyframe-based animation data in three-dimensional space and provided to animate motion.

18 Claims, 8 Drawing Sheets

(56) References Cited

U.S. PATENT DOCUMENTS

| | | | | |
|---|---|---|---|---|
| 2008/0024503 | A1* | 1/2008 | Smith | G06T 13/40 |
| | | | | 345/473 |
| 2014/0160122 | A1* | 6/2014 | Chou | G06T 13/40 |
| | | | | 345/420 |
| 2015/0099252 | A1* | 4/2015 | Anderson | G06T 7/251 |
| | | | | 434/257 |
| 2016/0086350 | A1* | 3/2016 | Michel | G06T 7/75 |
| | | | | 382/103 |
| 2019/0164346 | A1* | 5/2019 | Kim | G06T 15/005 |
| 2019/0206145 | A1* | 7/2019 | Li | G06T 15/503 |
| 2020/0035021 | A1* | 1/2020 | Horsman | G06T 7/593 |
| 2020/0293881 | A1* | 9/2020 | Taylor | G06N 3/08 |
| 2020/0312011 | A1* | 10/2020 | Kopeinigg | G06T 19/006 |
| 2023/0033290 | A1* | 2/2023 | Starke | G06V 40/107 |
| 2023/0177755 | A1* | 6/2023 | Starke | G06T 13/205 |
| | | | | 345/473 |

OTHER PUBLICATIONS

Radford, Alec, et al. "Learning transferable visual models from natural language supervision." International conference on machine learning. PMLR, 2021. (Year: 2021).*

Sun, Yu, et al. "Monocular, one-stage, regression of multiple 3d people." Proceedings of the IEEE/CVF international conference on computer vision. 2021. (Year: 2021).*

Moon, Gyeongsik, Ju Yong Chang, and Kyoung Mu Lee. "Camera distance-aware top-down approach for 3d multi-person pose estimation from a single rgb image." Proceedings of the IEEE/CVF international conference on computer vision. 2019. (Year: 2019).*

Alberto Cannavò, Claudio Demartini, Lia Morra, and Fabrizio Lamberti. 2019. Immersive virtual reality-based interfaces for character animation. IEEE Access 7 (2019), 125463-125480 (Year: 2019).*

Xia, Guiyu, et al. "Keyframe-editable real-time motion synthesis." IEEE Transactions on Circuits and Systems for Video Technology 32.7 (2021): 4538-4551. (Year: 2021).*

Arora et al., "MagicalHands: Mid-Air Hand Gestures for Animating in VR," Proceedings of the 32nd Annual ACM Symposium on User Interface Software and Technology, New Orleans, LA, Oct. 20-23, 2019, pp. 463-477.

Ashtari et al., "Creating Augmented and Virtual Reality Applications: Current Practices, Challenges, and Opportunities," Paper 593, Proceedings of the 2020 CHI Conference on Human Factors in Computing Systems, Honolulu, HI, Apr. 25-30, 2020, pp. 1-13.

Berford et al., "Building an animation pipeline for VR stories," ACM SIGGRAPH 2017 Talks, Los Angeles, CA, Jul. 30-Aug. 3, 2017, 2 pages.

Bogo et al., "Keep it SMPL: Automatic estimation of 3D human pose and shape from a single image," Presented at 14th European Conference on Computer Vision, Amsterdam, The Netherlands, Oct. 8-16, 2016; Lecture Notes in Computer Science, 2016, 9909:561-578.

Cannavò et al., "Immersive virtual reality-based interfaces for character animation," IEEE Access, 2019, 7:125463-125480.

Cao et al., "OpenPose: Realtime Multi-Person 2D Pose Estimation using Part Affinity Fields," IEEE Transactions on Pattern Analysis and Machine Intelligence, 2019, 43(1):172-186.

Cao et al., "Realtime Multi-Person 2D Pose Estimation using Part Affinity Fields," Proceedings of the IEEE Conference on Computer Vision and Pattern Recognition (CVPR), Honolulu, HI, Jul. 21-26, 2017, pp. 7291-7299.

Chen et al., "3D human pose estimation = 2D pose estimation + matching," Proceedings of the IEEE Conference on Computer Vision and Pattern Recognition (CVPR), Honolulu, HI, Jul. 21-26, 2017, pp. 7035-7043.

Clarke et al., "Reactive Video: Adaptive Video Playback Based on User Motion for Supporting Physical Activity," Proceedings of the 33rd Annual ACM Symposium on User Interface Software and Technology (UIST '20), Virtual Event, USA, Oct. 20-23, 2020, pp. 196-208.

Dabral et al., "Learning 3D human pose from structure and motion," Proceedings of the 15th European Conference on Computer Vision, Munich, Germany, Sep. 8-14, 2018; Lecture Notes in Computer Science, 2018, 11213:679-696.

Disney Animation.com [online], "PoseVR," Aug. 2017, retrieved Apr. 4, 2022, retrieved from URL <https://disneyanimation.com/projects/?drawer=/technology/posevr/>, 1 page.

Fang et al., "RMPE: Regional Multi-Person Pose Estimation," Proceedings of the IEEE International Conference on Computer Vision (ICCV), Venice, Italy, Oct. 22-29, 2017, pp. 2353-2362.

Galvane et al., "VR as a Content Creation Tool for Movie Previsualisation," Proceedings of the 2019 IEEE Conference on Virtual Reality and 3D User Interfaces (VR), Osaka, Japan, Mar. 23-27, 2019, pp. 303-311.

Glauser et al., "Rig animation with a tangible and modular input device," ACM Trans. Graph., Jul. 2016, 35(4):144, 11 pages.

González-Franco et al., "MoveBox: Democratizing MoCap for the Microsoft Rocketbox Avatar Library," Proceedings of the IEEE 3rd International Conference on Artificial Intelligence & Virtual Reality (AIVR), Virtual Event, Dec. 14-18, 2020, pp. 91-98.

Gonzalez-Franco et al., "The Rocketbox Library and the Utility of Freely Available Rigged Avatars," Frontiers in Virtual Reality, Nov. 2020, 1:561558, 23 pages.

Hamanishi et al., "PoseAsQuery: Full-Body Interface for Repeated Observation of a Person in a Video with Ambiguous Pose Indexes and Performed Poses," AHs '20: Proceedings of the Augmented Humans International Conference, Kaiserslautern, Germany, Mar. 16-17, 2020, Article 13, 11 pages.

Hamanishi et al., "Supple View: Rotation-Based Browsing Method by Changing Observation Angle of View for an Actor in Existing Videos," Proceedings of the International Conference on Advanced Visual Interfaces (AVI '20), Salerno, Italy, Sep. 28-Oct. 2, 2020; ACM, Article 95, 3 pages.

Held et al., "3D puppetry: a kinect-based interface for 3D animation," UIST '12: Proceedings of the 25th annual ACM symposium on User Interface Software and Technology, Cambridge, MA, Oct. 7-10, 2012, 12:423-434.

Hossain et al., "Exploiting temporal information for 3D human pose estimation," Proceedings of the 15th European Conference on Computer Vision, Munich, Germany, Sep. 8-14, 2018; Lecture Notes in Computer Science, 2018, 11214:69-86.

Hughes et al. "CaveCAD: Architectural design in the CAVE," 2013 IEEE Symposium on 3D User Interfaces (3DUI), Orlando, FL, Mar. 16-17, 2013, pp. 193-194.

Ionescu et al., "Human3.6M: Large scale datasets and predictive methods for 3D human sensing in natural environments," IEEE Transactions on Pattern Analysis and Machine Intelligence, Jul. 2014, 36(7):1325-1339.

Jégou et al., "Product Quantization for Nearest Neighbor Search," IEEE Transactions on Pattern Analysis and Machine Intelligence, Jan. 2011, 33(1):117-128.

Kanazawa et al., "Learning 3D human dynamics from video," Proceedings of the IEEE Conference on Computer Vision and Pattern Recognition (CVPR), Long Beach, CA, Jun. 15-20, 2019, pp. 5607-5616.

Kang et al., "Interactive Animation Generation of Virtual Characters Using Single RGB-D Camera," Vis. Comput., Jun. 2019, 35:849-860.

Kocabas et al., "VIBE: Video inference for human body pose and shape estimation," Proceedings of the IEEE/CVF Conference on Computer Vision and Pattern Recognition (CVPR), Virtual Event, Jun. 14-19, 2020, pp. 5253-5263.

Kytö et al., "Improving 3D character posing with a gestural interface," IEEE Computer Graphics and Applications, Nov. 2015, 37(1):70-78.

Lee et al., "Semantic Human Activity Annotation Tool Using Skeletonized Surveillance Videos," Adjunct Proceedings of the 2019 ACM International Joint Conference on Pervasive and Ubiquitous Computing and Proceedings of the 2019 ACM International

(56) References Cited

OTHER PUBLICATIONS

Symposium on Wearable Computers, London, United Kingdom, Sep. 9-13, 2019; UbiComp/ISWC '19 Adjunct, 2019, pp. 312-315.
Lee et al., "Skeletonographer: Skeleton-Based Digital Ethnography Tool," 22nd ACM Conference on Computer-Supported Cooperative Work and Social Computing, Austin, TX, Nov. 9-13, 2019; CSCW '19 Companion, 2019, pp. 14-17.
Liu et al., "PoseTween: Pose-Driven Tween Animation," UIST '20: The 33rd Annual ACM Symposium on User Interface Software and Technology, Virtual Event, USA, Oct. 20-23, 2020, pp. 791-804.
Luvizon et al., "2D/3D Pose Estimation and Action Recognition Using Multitask Deep Learning," 2018 IEEE/CVF Conference on Computer Vision and Pattern Recognition (CVPR), Salt Lake City, UT, Jun. 18-23, 2018, pp. 5137-5146.
Martinez et al., "A simple yet effective baseline for 3D human pose estimation," Proceedings of 2017 IEEE International Conference on Computer Vision (ICCV), Venice, Italy, Oct. 22-29, 2017, pp. 2659-2668.
Mehta et al., "VNect: Real-time 3D Human Pose Estimation with a Single RGB Camera," ACM Trans. Graph., Jul. 2017, 36(4):44, 14 pages.
Mehta et al., "XNect: Real-time multi-person 3D motion capture with a single RGB camera," ACM Trans. Graph., Jul. 2020, 39(4):82, 17 pages.
Microsoft.com [online], "Microsoft Maquette Beta Overview," 2019, retrieved on May 3, 2022, retrieved from URL <https://docs.microsoft.com/en-us/windows/mixed-reality/design/maquette>, 5 pages.
Mindshow.com [online], "Mindshow," 2020, retrieved on May 12, 2022, retrieved from URL <https://mindshow.com/>, 5 pages.
Müller et al., "SpatialProto: Exploring Real-World Motion Captures for Rapid Prototyping of Interactive Mixed Reality," Proceedings of the CHI Conference on Human Factors in Computing Systems (CHI '21), Yokohama, Japan, May 8-13, 2021, ACM, 13 pages.
Nebeling et al., "XRDirector: a role-based collaborative immersive authoring system," Paper 508, Proceedings of the 2020 CHI Conference on Human Factors in Computing Systems, Honolulu, HI, Apr. 25-30, 2020, 12 pages.
Nitsche et al., "Cell phone puppets: turning mobile phones into performing objects," Entertainment Computing—11th International Conference on Entertainment Computing (ICEC 2012), Bremen, Germany, Sep. 26-29, 2012; Lecture Notes in Computer Science, 2012, 7522:363-372.
nvrmind.com [online], "AnimVR," 2018, retrieved on May 3, 2022, retrieved from URL <https://nvrmind.io/#features>, 10 pages.
Oculus.com [online], "Oculus Medium," 2016, retrieved on May 3, 2022, retrieved from URL <https://www.oculus.com/medium/>, 11 pages.
Pan et al., "PoseMMR: A Collaborative Mixed Reality Authoring Tool for Character Animation," 2020 IEEE Conference on Virtual Reality and 3D User Interfaces Abstracts and Workshops (VRW), Atlanta, GA, Mar. 22-26, 2020, pp. 758-759.
Park et al., "Video-Guided Motion Synthesis Using Example Motions," ACM Trans. Graph., Oct. 2006, 25(4):1327-1359.
Pavllo et al., "3D human pose estimation in video with temporal convolutions and semi-supervised training," Proceedings of the IEEE Conference on Computer Vision and Pattern Recognition (CVPR), Long Beach, CA, Jun. 15-20, 2019, pp. 7745-7754.
Quill.fb.com [online], "Quill: Storytelling in VR," 2021, retrieved on May 11, 2022, retrieved from URL <https://quill.fb.com/>, 3 pages.
Schultheis et al., "Comparison of a two-handed interface to a wand interface and a mouse interface for fundamental 3D tasks," 2012 IEEE Symposium on 3D User Interfaces (3DUI), Orange County, CA, Mar. 4-5, 2012, pp. 117-124.
Sigal et al., "Humaneva: Synchronized video and motion capture dataset and baseline algorithm for evaluation of articulated human motion," Int. J. Comput. Vis., Aug. 2009, 87:4, 24 pages.
Sigal et al., "Humaneva: Synchronized video and motion capture dataset for evaluation of articulated human motion," Brown University Technical Report CS-06-08 120, Sep. 2006, 18 pages.
Storyblocks.com [online], "Storyblocks: Create More Video, Faster Than Ever," 2017, retrieved on May 9, 2022, retrieved from URL <https://www.storyblocks.com/video>, 1 page.
Takahashi et al., "VR-based Batter Training System with Motion Sensing and Performance Visualization," Proceedings of the 2019 IEEE Conference on Virtual Reality and 3D User Interfaces (VR), Osaka, Japan, Mar. 23-27, 2019, pp. 1353-1354.
Tharatipyakul et al., "Pose Estimation for Facilitating Movement Learning from Online Videos," Proceedings of the International Conference on Advanced Visual Interfaces (AVI '20), Salerno, Italy, Sep. 28-Oct. 2, 2020; ACM, Article 64, 5 pages.
Tiltbrush.com [online], "Tilt Brush: Painting from a new perspective," 2016, retrieved on May 3, 2022, retrieved from URL <http://www.tiltbrush.com/>, 14 pages.
Tvori.co [online], "Tvori: Designing VR & AR. Simplified." 2019, retrieved on May 3, 2022, retrieved from URL <http://tvori.co/>, 8 pages.
Unity3D.com [online], "Unity Manual: Animation System Overview," 2021, retrieved on May 3, 2022, retrieved from URL <https://docs.unity3D.com/Manual/AnimationOverview.html>, 4 pages.
Valente et al., "From A-Pose to AR-Pose: Animating Characters in Mobile AR," Special Interest Group on Computer Graphics and Interactive Techniques Conference Appy Hour (SIGGRAPH '21 Appy Hour), Virtual Event, USA, Aug. 9-13, 2021; ACM,, Article 4, 2 pages.
Vogel et al., "AnimationVR—Interactive Controller-Based Animating in Virtual Reality," 2018 IEEE Conference on Virtual Reality and 3D User Interfaces (VR), Reutlingen, Germany, Mar. 18-22, 2018, Abstract, 1 page.
Von Marcard et al., "Recovering accurate 3D human pose in the wild using imus and a moving camera," Proceedings of the 15th European Conference on Computer Vision, Munich, Germany, Sep. 8-14, 2018; Lecture Notes in Computer Science, 2018, 11214:614-631.
Wang et al., "ReliveReality: Enabling Socially Reliving Experiences in Virtual Reality via a Single RGB camera," 2020 IEEE Conference on Virtual Reality and 3D User Interfaces Abstracts and Workshops (VRW), Atlanta, GA, Mar. 22-26, 2020, pp. 710-711.
Willett et al., "Pose2Pose: Pose Selection and Transfer for 2D Character Animation," IUI '20: Proceedings of the 25th International Conference on Intelligent User Interfaces, 2020, pp. 88-99.
Xiu et al., "Pose Flow: Efficient Online Pose Tracking," BMVC, 2018, 12 pages.
Xu et al., "DenseRaC: Joint 3D pose and shape estimation by dense render-and-compare," 2019 IEEE/CVF International Conference on Computer Vision (ICCV 2019), Seoul, South Korea, Oct. 27-Nov. 2, 2019, pp. 7759-7769.
Xu et al., "Mo2Cap2: Real-time mobile 3D motion capture with a Cap-mounted fisheye camera," IEEE Transactions on Visualization and Computer Graphics, May 2019, 25(5):2093-2101.
Ye et al., "ARAnimator: In-Situ Character Animation in Mobile AR with User-Defined Motion Gestures," ACM Trans. Graph., Jul. 2020, 39(4):83, 12 pages.
Zhang et al., "Semantics-Guided Neural Networks for Efficient Skeleton-Based Human Action Recognition," Proceedings of the IEEE/CVF Conference on Computer Vision and Pattern Recognition (CVPR), Virtual Event, Jun. 14-19, 2020, pp. 1109-1118.
Casiez et al., "1€ Filter: a Simple Speed-based Low-pass Filter for Noisy Input in Interactive Systems," Session: Interactions Beyond the Desktop, May 2012, 4 pages.
Github.com [online], "FAISS," published on Jan. 10, retrieved on Feb. 9, 2022, retrieved from URL<https://github.com/facebookresearch/faiss>, 4 pages.
Johnson et al., "Billion-scale Similarity Search with GPUs," arXiv:1702.08734v1, Feb. 28, 2017, 12 pages.
Moon et al., "Camera Distance-aware Top-down Approach for 3D Multi-person Pose Estimation from a Single RGB Image," arXiv:1907.11346v2, Aug. 17, 2019, 15 pages.
Openai.com [online], "CLIP: Connecting Text and Images," published on Jan. 5, 2021, retrieved on Feb. 9, 2022, retrieved from URL<https://openai.com/blog/clip/>, 16 pages.

(56) References Cited

OTHER PUBLICATIONS

Radford et al., "Learning Transferable Visual Models from Natural Language Supervision," arXiv:2103.00020v1, Feb. 26, 2021, 48 pages.
Sun et al., "Monocular, One-stage, Regression of Multiple 3D People," International Conference on Computer Vision, 2021, pp. 11179-11188.

* cited by examiner

CHARACTER ANIMATIONS IN A VIRTUAL ENVIRONMENT BASED ON RECONSTRUCTED THREE-DIMENSIONAL MOTION DATA

BACKGROUND

This specification relates to motion data used in computer graphics applications, such as computer generated animation and/or computer aided design of physical structures and/or other visualization systems and techniques.

Computer graphics applications include different software products and/or services that support generation of representations of three-dimensional (3D) objects and characters that can be used for visualization of scenes in display frames, for animation and video rendering, etc. Computer graphics applications also include computer animation programs and video production applications that generated 3D representations of objects and character in motion. 3D computer animations can be created in a variety of scenarios and in the context of different technologies. For example, characters and vehicles can be animated for computer games, cartoon movies, and virtual reality applications, among other examples. Prototyping stories and animations can be performed in a Virtual Reality (VR) environment and based on VR technologies.

SUMMARY

This specification relates to 3D character animations in a VR environment. Particular embodiments of the subject matter described in this specification can be implemented to realize one or more of the following advantages.

In a first aspect, one example method can include operations such as constructing three-dimensional motion data from two-dimensional videos, the three-dimensional motion data representing movement of people in the two-dimensional videos and including, for each person, a root of a three-dimensional skeleton of the person, wherein the three-dimensional skeleton includes multiple three-dimensional poses of the person during at least a portion of frames of a video from the two-dimensional videos; converting the three-dimensional motion data into editable keyframe-based animation data in three-dimensional space; and providing the editable keyframe-based animation data for applying to a character to animate motion of the character in three-dimensional space.

Other implementations of this first aspect include corresponding systems, apparatus, and computer programs, configured to perform the actions of the methods, encoded on computer storage devices.

In a second aspect, an example method can include receiving a search query in a virtual reality (VR) environment; retrieving a set of editable keyframe-based animation data relevant to the search query from a database including editable keyframe-based animation data, associated text descriptions, and two-dimensional videos correspondingly associated with movements related to the editable keyframe-based animation data, wherein the editable keyframe-based animation data has been generated from three-dimensional motion data constructed from the two-dimensional videos and represents the movements in the two-dimensional videos, and wherein the editable keyframe-based animation data and the associated text descriptions have been generated from the two-dimensional videos; and presenting a user interface in the VR environment for use in prototyping VR character animations using the set of the editable keyframe-based animation data of the database, wherein the user interface provides interfaces for searching and displaying two-dimensional videos from the database to select a motion from a corresponding two-dimensional video to be applied to a character during VR character animation, and wherein the user interface allows editing of the selected motion when applied to the character in the VR environment.

Other implementations of this first aspect include corresponding systems, apparatus, and computer programs, configured to perform the actions of the methods, encoded on computer storage devices.

In some instances, features of the first aspect and the second aspect are combinable to support prototyping animations of characters in three-dimensional space, for example, through a user interface in a VR environment.

Particular embodiments of the subject matter described in this specification can be implemented to realize one or more of the following advantages. Based on 3D motion data converted to editable keyframe-based animation data and provided for use in prototyping animations of characters, the animation production process can be performed faster, with reduced resource expenditures, and with improved quality of the resulting product. The users can be provided with flexible techniques to efficiently search a database of pre-generated editable keyframe-based animation data that are easy to use, adjust, and combine to create realistic motions of characters when prototyping character animations. The animation data is pre-prepared and ready for use in an intuitive manner that improves the user experience, e.g., for novice animators. The animation data can be created based on online videos that can stimulate a fast process of data creating based on diverse selection of various examples of a particular movement. The prototyped animations based on the use of the provided editable keyframe-based motion data can generate more convincing results that resemble real-life movements compared to animations based on manual intensive work of an artist to manually create keyframes.

Since the users do not have to manually pose joints on the 3D characters that are animated to create the keyframes, the animation generation processes is optimized by reducing the amount of manual work and performing the keyframe generation faster. Further, the user interface can provide a user with search options to readily invoke motion data based on reviewing associated 2D videos presenting respective movements associated with the motion data. A motion database that exposed the animation motion data can be searched faster based on the provided index object encapsulating features vectors associated with 2D videos used for the generation of the motion data. The users can be provided with user-friendly tools to quickly identify desired movements to be applied on characters during animation prototyping. The use of the editable keyframe-based motion data when creating animation of characters can be associated with fewer steps to customize the movement or to combine one movement with another to provide realistic animations in a fast, efficient and effective manner. The provided editable keyframe-based motion data can be used in VR environment in a more intuitive manner that lowers or eliminates the learning curve for novice users. The described approaches can result in fewer interactions with the system to yield the desired result, which ultimately reduces the system resources spend to provide realistic animation.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
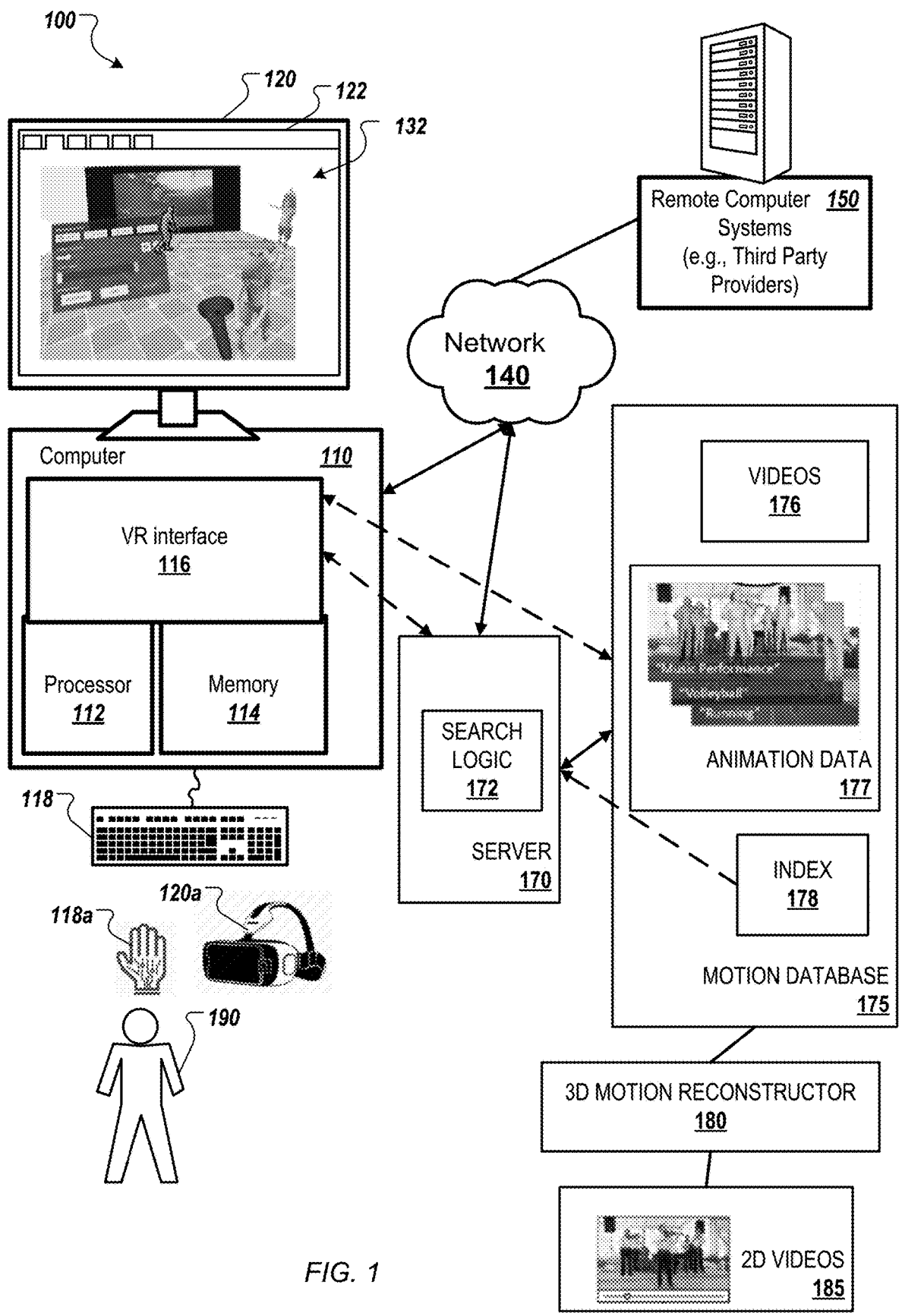
FIG. 1 shows an example of a system usable to usable to reconstruct 3D motion data from 2D videos that can be used to generate animations in a VR environment.

The present disclosure describes various tools and techniques for generating editable keyframe-based animation data that can be used for animation of 3D characters in a virtual reality (VR) environment. Animation is based on principles of human sight and a series of images are presented in a quick succession to be perceived by the viewer as a continuous motion. Each individual image is referred to as a frame, and the illusion of motion is provided from the fact that each frame is visualized for a short time after it was seen. Creating animation may require the generation of hundreds of separate images, where the number of the images can correspond to the quality level defined for the animation. The creation of a large number of images is a time-consuming and labor-intensive task.

In some instances, when an animation is created, a set of important frames can be produced that are called keyframes, and later on in-between frames (also known as tweens) can be drawn to fill in the gaps between the keyframes to draw what is expected to precede and/or succeed a keyframe. Once all keyframes and tweens are generated, the images can be inked or rendered to produce the final images.

In some instances, keyframes can be created to present beginnings and endings of an animated sequence. In some instances, the tweens can be produced by a computer animation assistant in an automated process that may not require manual input from an animation designer or artist.

In some implementations, VR technologies can be used for prototyping animations. Creation of 3D characters can be a time-consuming tasks with regard to manual work to pose joints of 3D characters when creating keyframes that are later interpolated by animation assistant software programs. The keyframe-base animation can be associated with extensive learning for an artist or animator to prepare animations that are convincing and replicate real-life movements.

In some instances, 3D input from a user that is provided based on gestures, VR controllers, other controllers, or depth cameras can be used to create character animations. An animator tool can use VR devices as puppets to manipulate poses of one or more characters in the 3D space. However, while such techniques can be easy to use and fast to create animation, they require manual input from users to perform the motions and to manipulate the points to create keyframes that would result in an animation that is realistic and with high quality.

In some implementations, a system to facilitate creation of keyframes for use in animating characters can leverage two-dimension (2D) videos as input to enable rapid character prototyping by using 3D motions extracted from the 2D videos. In some implementations, software tools and techniques can be used to build a powerful 3D animation pipeline for reconstructing 3D poses and motions of characters from the 2D videos to enable rapid prototyping of character animations in the 3D space. In some implementations, 2D videos are be used to construct 3D motion data that can be used to intuitively visualize and manipulate motion of animation characters. The 3D motion data can be converted into editable keyframe-based animation data in the 3D space and provided for applying to a character to animate motion. In some instances, the animation of characters can be performed in a VR environment.

FIG. 1 shows an example of a system 100 usable to reconstruct 3D motion data from 2D videos that can be used to generate animations in a VR environment. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including animation programs, which implement 3D animation functions.

The computer 110 includes a VR interface 116 that allows users to use motion data to animate characters in VR space. In some instances, the VR interface 116 can obtain 3D motion data from a motion database 175. A user 190 can interact with the VR interface 116 to create an animation by searching for motion data through searching logic 172 implemented at a server 170.

The VR Interface 116 can run locally on the computer 110, remotely on a computer of one or more remote computer systems 150 (e.g., one or more third party providers' one or more server systems accessible by the computer 110 via the network 140) or both locally and remotely.

In some implementations, a 3D motion reconstructor 180 is provided to reconstruct 3D poses and motions from 2D videos 185 and to provide the 3D motion data for use in animation scenarios. The reconstructed 3D motion data can be converted into editable keyframe-based animation data and provide as animation data 177 for applying during generation of animations by a user such as user 190 when interacting with computer 110. The motion database 175 to be accessed and provided data and videos can be used for prototyping character animations in a 3D space (e.g., in a VR environment).

In some instances, the generation of animations can be performed in a VR environment through the VR Interface 116. The VR Interface 116 displays a VR scene where animations are created and invokes animation data related to requested movement(s) from the motion database 175. The animation data 177 can be editable keyframe-based animation data that is applied to characters at the VR interface 116 during animation prototyping.

In some implementations, the motion database 175 can store videos 176 that map to the animation motion data 177. The videos 176 can at least partially correspond to the 2D videos 185, where the videos 176 can be a portion or the whole videos from the 3D videos 185. In some instances, the 2D videos 185 are videos posted online that include motions of different types. For example, the 2D videos can include videos capturing sports movements (e.g., tennis playing, skiing, boxing, football playing, etc.), performances (e.g., musical performances, ballet, theater performance, etc.), and dance movements, among other motions.

In some implementations, the motion database 175 includes an index 178 that is generated based on the animation data 177 to facilitate searching of movements represented by editable keyframe-based animation data at the animation data 177. The index 178 can include an index object that encapsulates feature vectors associated with different movements to pair a text description with a movement. The index 178 can be used for comparison with a query vector generated during searching for a movement to animate the motion of the character.

The VR Interface 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a.

In the example shown, a VR scene 132 is rendered to the display device 120 in the UI 122. The VR scene is edited to create an animation based on searching for motion data provided from the motion database 175. The animation data 177 can have associated captions describing the corresponding motions, and the different motions can have a corresponding video from the videos 176. The user 190 can query the server 170 with a request for motion data for a particular movement, e.g., a tennis play, and the server 170 can use the index 178 to compute similarity scores for the videos 176 with regard to the user query to provide available keyframe-based animation data. Based on the result from the query, the VR interface 116 can request videos and corresponding motion data corresponding to the result from the searching, which identifies closest data to the requested movement. The VR interface 116 can retrieve videos and motion data from the motion database 175 and use this data to selectively apply the motion data to animate characters in the 3D space.

The systems and techniques described herein are applicable to any suitable animation software program. Thus, in some implementations, the VR environment 116 can be animation production programs that render the 3D characters and objects to a video file of an appropriate format for visual display, such as by a digital projector (e.g., a digital cinema package (DCP) for movie distribution) or other high resolution display device. In some other examples, the VR interface 116 can be video production software that renders the animated keyframes based on motion data from the motion database 175 as part of a rendered scene or frame. Other applications are also possible.

Figure 2A:
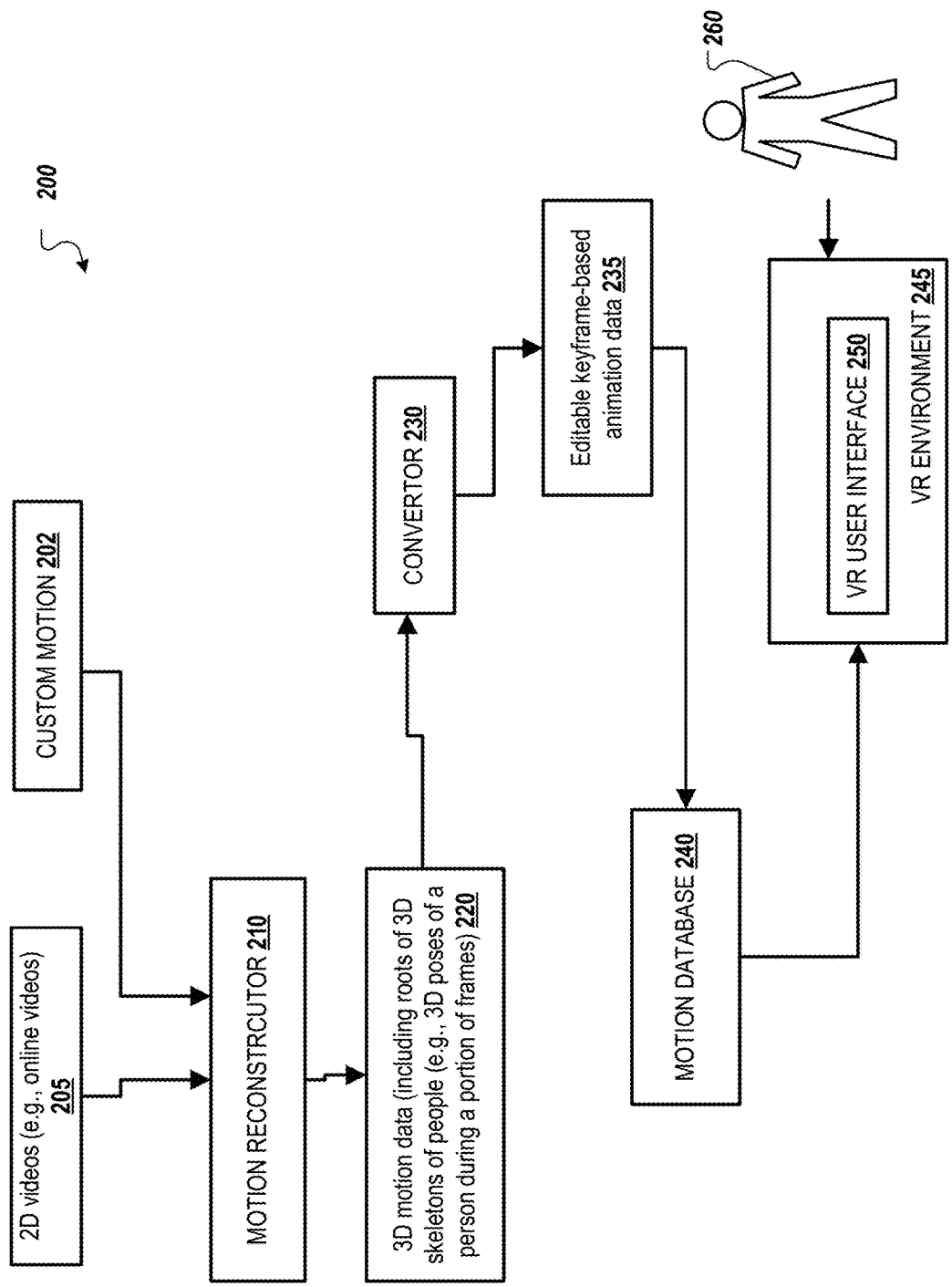
FIG. 2A shows an example of a process to extract three-dimensional (3D) motion from two-dimensional (2D) videos and to convert it to animation data to be provided in a motion database for use at a virtual reality (VR) user interface at a VR environment in accordance with implementations of the present disclosure.

FIG. 2A shows an example of a process 200 to extract 3D motion from 2D videos and to convert it to animation data to be provided in a motion database for use at a VR user interface at a VR environment in accordance with implementations of the present disclosure. In some implementations, the process 200 can be executed at a system environment substantially similar to (or equivalent to) the system 100. The process 200 can be executed in relation to a process for converting 2D videos into animation data to be used for animating characters in 3D space at a VR interface.

In some implementations, the process 200 can be executed at an animation system that includes a reconstruction pipeline to extract 3D motions from videos (e.g., videos posted online). In some implementations, the animation system can include a VR user interface (UI) 250 that allows users (e.g., user 260) to intuitively visualize and manipulate life-size motions captured at the videos to animate characters in VR.

A motion reconstructor 210 obtains 2D videos 205. The 2D videos 205 can be videos that are published online, for example, at an online platform such as a social network platform, entertainment platform, and/or film distribution database, among other example applications, services or systems that expose online 2D videos. The motion reconstructor 210 reconstructs 3D motions from the 2D videos 205 and provides 3D motion data 220.

The 3D motion data 220 includes roots of 3D skeletons of people performing movements at a respective video from the 2D videos 205. The 3D motion data can include motion data generated based on a video from the videos 205 that define 3D poses of a person during a portion of frames from the respective video. In some implementations, the motion reconstructor 210 can classify the motion into a category (or more than one category) from a set of predefined categories. In some instances, the predefined set of categories can include sport movements, dance movements, performances, general daily life movements, gestures, and others.

In some implementations, a video representing a tennis player playing at the tennis court can be used to reconstruct 3D motion data including 3D poses of the player while he is changing his joint positions in 3D space (skeleton) to play the tennis game within at least a portion of the video. In some instances, a section of the video including a portion of frames from the video can be used to reconstruct the 3D motion. For example, the section (or portion) of the video can be determined based on a pre-evaluation of the video to determine locations that represent a movement (e.g., a forehand move) that is to be represented with the 3D motion data.

The 3D motion data 220 is provided to a convertor 230 that is configured to convert the 3D motion data 220 into editable keyframe-based animation data 235 in 3D space.

The convertor 230 provides the converted editable keyframe-based animation data 235 to a motion database 240. The motion database 240 can store keyframe-based animation data.

In some implementations, the motion reconstructor 210 can obtain a custom motion 202. The custom motion 202 can be provided through a user interaction captured at a VR user interface associated with the motion reconstructor 210. The custom motion can be processed at the motion reconstructor 210 and further at the convertor 230 to generate editable keyframe-based animation data in a similar manner as the 2D videos 205. The editable keyframe-based animation data from the custom motion 202 and/or from the 2D videos can be combined. In some instances, the animation data generated based on the custom motion 202 can be combined with animation data associated one or more selected movements that are identified at the 2D videos.

In some instances, the motion data 240 substantially corresponds to (or is) the motion database 175 of FIG. 1. The motion database 240 can also store at least portions of the 2D videos mapped to correspondingly generated editable keyframe-based animated data 235.

In some instances, the generated editable keyframe-based animation data, as converted, can be classified with text labels. The classification can be performed automatically without manual input by using automated pre-trained tools to generate text descriptions out of videos. In some implementations, to generate text description of the videos, different language-image techniques can be used to perform text captioning. For example, generation of text descriptions can be performed according to the techniques described at "Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al.: Learning transferable visual models from natural language supervision," which is hereby incorporated by reference. For example, generation of text descriptions can be performed using pre-trained image and text encoders that predict which images are to be paired with which text descriptions.

In some implementations, an algorithm (e.g., a machine learning algorithm) to caption videos can be used that is trained on a large training set of image-text pairs to associate images with natural language descriptions. In some implementations, when generating text descriptions for a video from the 2D videos 205, the video can be sample with one frame of the video every second, and a pre-trained transformer can be used to generate text descriptions for each frame. The text description can be represented as a feature vector and stored together with the corresponding video and the generated animation data so that the text description can be paired with the motion.

In some instances, the generation of text descriptions can support searching of animation data that is provided at a motion database with the mapped text descriptions. Based on used techniques to process the videos, textual image description can be generated for classification of the 2D videos used for the animation data generation.

In some implementations, generating text descriptions per second for each video can result in a large number of captions. The generation of multiple captions may be time consuming and inefficient from the perspective of providing the multiple captions for searching at runtime. Thus, in some implementations, to facilitate searching, an index object can be generated. For example, the index object can be generated based on techniques for generating feature vectors for each of the 2D videos based on the determined text descriptions. For example, the techniques for generating the feature vectors can be such as the techniques described at "Jeff Johnson, Matthijs Douze, and Hervé Jégou: Billion-Scale Similarity Search with GPUs," which is hereby incorporated by reference. In some implementations, the techniques used for generating the feature vectors can better utilize one or more graphical processing units (GPUs) for performing efficient similarity searches using an index type that stores a set of vectors. The index object can be generated to encapsulate all the feature vectors of text descriptions for a video. Such an index object can allow for efficient comparisons between a query feature vector computed based on a query and stored featured vectors in the index object.

In some implementations, the motion databased can store an index object that includes feature vectors for detected movements at the 2D videos 205 to pair a text description with a movement represented by a keyframe-based animation data from the generated animation data 235.

In some instances, a user 260 can interact with a VR system 245 and through the VR UI 245 to search in the motion database 240. In some instances, the VR UI 245 can present videos associated with determined animation data based on the search in the motion database 240. The VR UI 245 can provide interactive options for the user 260 to present one or more of the videos associated with the search result and to select one of the videos to apply related animation data to animate a character. In some instances, the user 260 can apply the motion to one or more characters based on obtained animation data from the motion database, can manipulate a motion timeline, can combine motions from different videos selected from the motion database 240 to create a new animation, and can combine motions related to a selected video with motions that are annually prepared or provided from another source database, among other available manipulations that the user 260 can perform to prototype animation using animation data from the motion database 240.

Figure 2B:
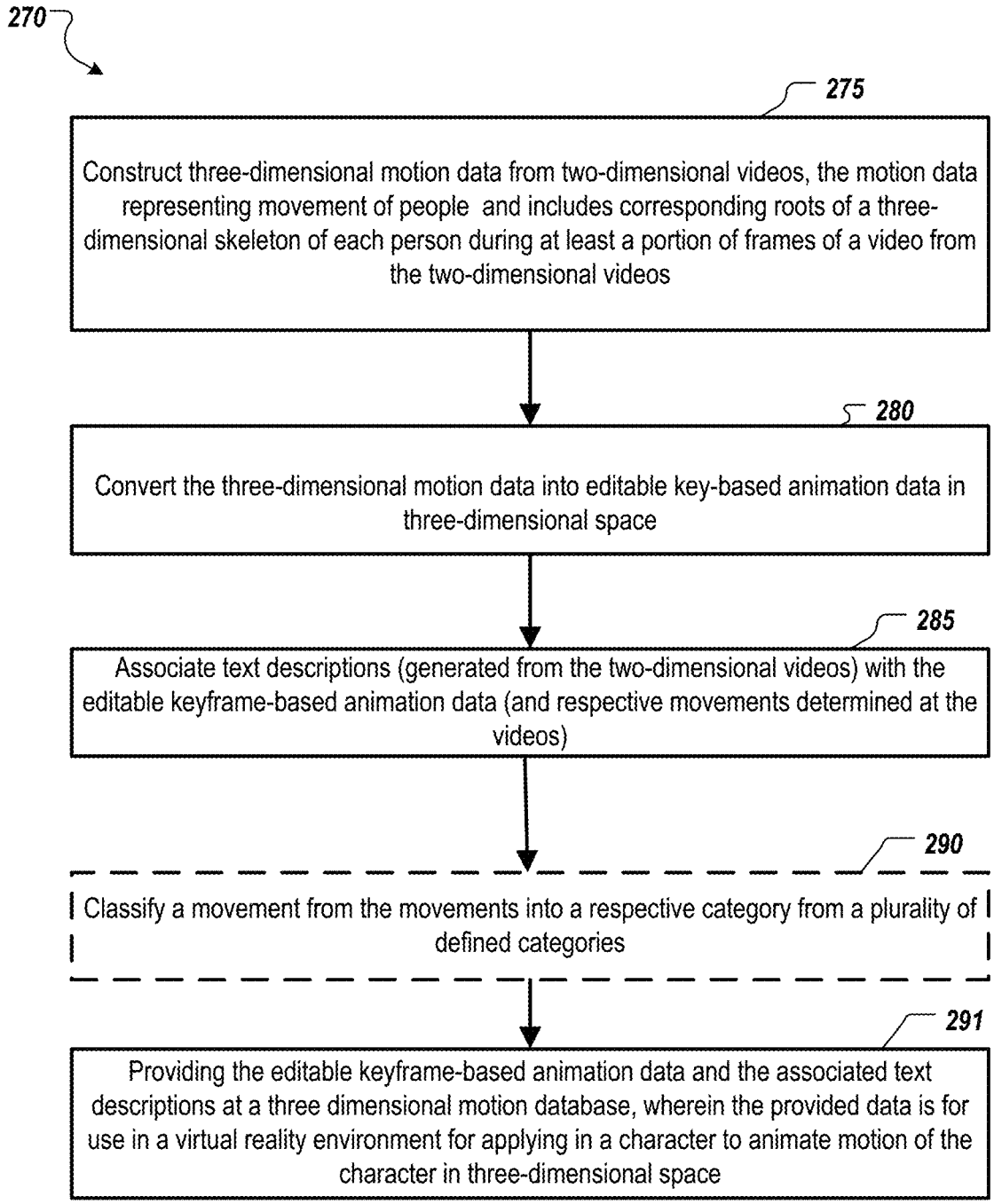
FIG. 2B shows an example of a process to provide editable keyframe-based animation data and associated text description at a 3D motion database for use in animating a character in a VR environment in accordance with implementations of the present disclosure.

FIG. 2B shows an example of a process 270 to provide editable keyframe-based animation data and associated text description at a 3D motion database for use in animating a character in a VR environment in accordance with implementations of the present disclosure. In some implementations, the process 270 can be executed at a system environment substantially similar to (or equivalent to) the system 100 of FIG. 1. The process 270 can be executed in relation to a process for converting 2D videos into animation data to be used for animating characters in 3D space at a VR interface.

In some implementations, the process 270 can be executed at an animation system that includes a reconstruction pipeline to extract 3D motions from videos (e.g., videos posted online) as discussed in relation to FIG. 2A.

At 275, 3D motion data is constructed from 2D videos. The construction of 3D motion data can be substantially similar to the construction of the 3D motion data 220 at FIG. 2A by the motion reconstructor 210 at FIG. 2A. The construction of the 3D motion data includes localizing a root of each person of at least a portion of the people in a video of the 2D videos with respect to estimated camera coordinates for the 2D videos.

The 3D motion data represents movement of people in the 2D videos. The 3D motion data can include data for each person in a video from the 2D videos that defines a root of a three-dimensional skeleton of the person. The 3D skeleton can include multiple three-dimensional poses of the person during at least a portion of frames of the video.

In some implementations, the reconstructed 3D motion data from the 2D videos is frame-by-frame 3D motion data, which can be difficult to modify. In order to facilitating users in editing such motion data and applying it to characters when prototyping animations, the 3D motion data can be converted into editable keyframe-based animations.

At 280, the 3D motion data is converted into editable keyframe-based animation data in 3D space. The conversion can be performed at a convertor such as the convertor 230 of FIG. 2A. The conversion of the raw 3D motion data into editable keyframe-based animation data can be performed by sampling the motion data at a defined frame speed. For example, the original 3D motion data as constructed at 275 can be sampled at 30 frames per second speed. In some instances, to smooth the converted animation, missing keyframes are interpolated or redundant keyframes are removed. The interpolation to add missing keyframes or to remove redundancies can ensure smoothness of the converted animation data in the joint rotation and position within a defined maximum rotation error (e.g., 0.15%) and a defined maximum position error (e.g., 0.1%) between the original 3D motion (at 275) and the converted animation (at 280).

At 285, text descriptions are associated with the editable keyframe-based animation data. The text descriptions are generated from the two-dimensional videos.

In some instances, optionally, at 290, a movement identified from the movements in the 2D videos can be classified into a respective category from a plurality of predefined categories. For example, in a video represents a tango dance, the movements of the tango dance can be classified in a category "dancing" in cases where "dancing" is one of the available categories in a predefined list. For example, a predefined list of categories can be defined for the 2D videos, and such a list can be dynamically updated to address changes in the type of movements that are presented in the videos that are used to create animation data. In some instances, an initial set of categories can be defined for the 2D videos that are used to construct 3D motion data (at 275). In some instances, the method 270 can be executed iteratively over a different set of 2D videos, and the list of categories from the first iteration can be reused or can be updated to add further categories that match the newly iterated 2D videos. In some instances, the list of predefined categories can be defined in a tree structure, where nodes of the tree can represent categories and subcategories linked in a hierarchical manner.

At 291, the editable keyframe-based animation data and the associated text descriptions are provided at a three-dimensional motion database to be used in a VR environment for animating motion of the character in three-dimensional space.

Figure 2C:
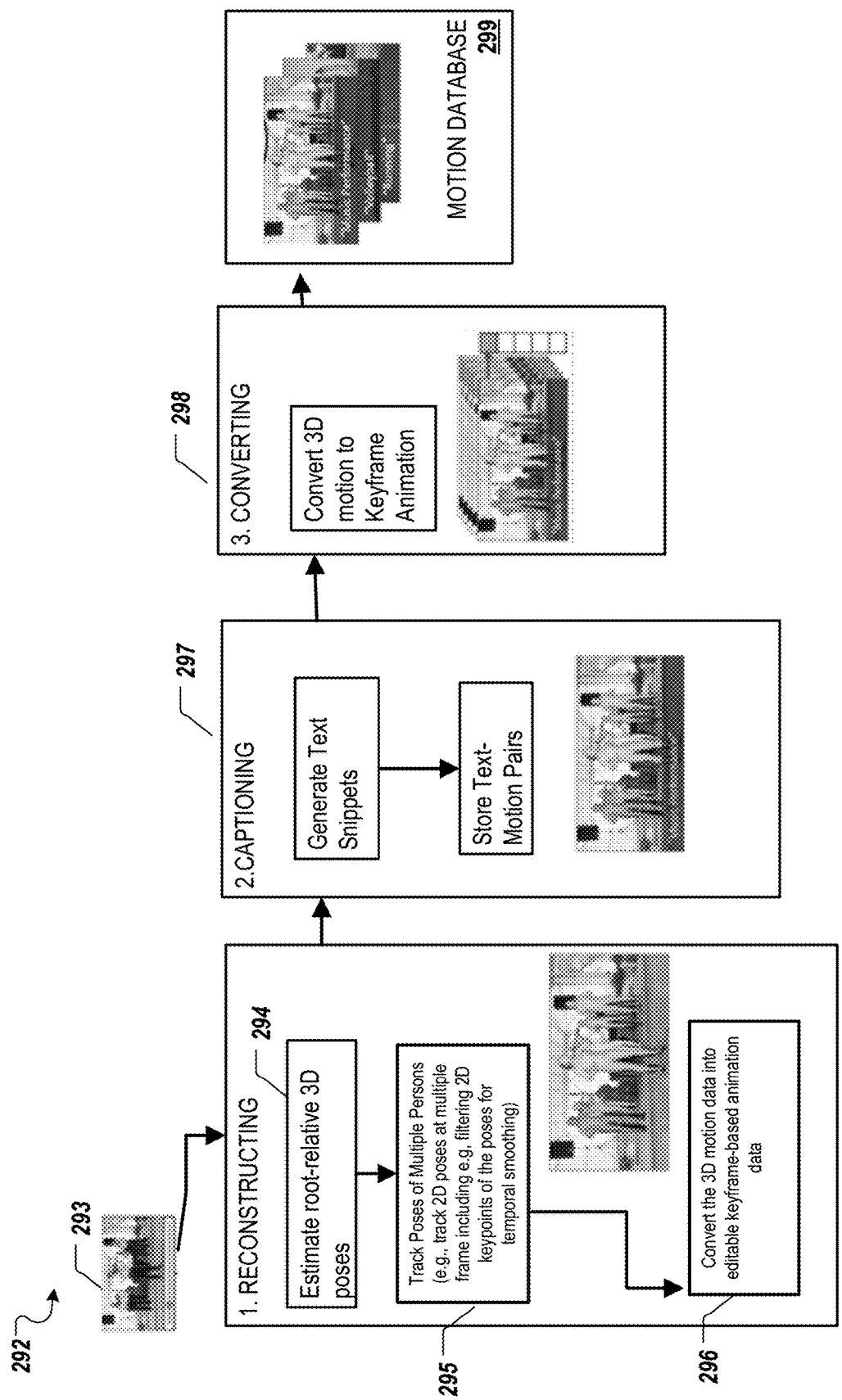
FIG. 2C shows an example of a process to generate keyframe-based animation by reconstructing 3D poses of a person in a 2D video in accordance with implementations of the present disclosure.

FIG. 2C shows an example of a process 292 to generate keyframe-based animation by reconstructing 3D poses of a person in a 2D video 293 in accordance with implementations of the present disclosure. In some instances, the process 292 can be executed at an animation system that includes a reconstruction pipeline to extract 3D motions from videos and provides editable keyframe-based animation data for use in a VR environment for animating motion of characters, as described in this disclosure. In some instances, the process 292 can be substantially similar to (or equivalent to) the processes described at FIGS. 1, 2A, and 2B. In some instances, the process 292 can be executed at a system environment substantially similar to (or equivalent to) the system 100 of FIG. 1.

In some instances, the process 292 relates to generating animation data from a 2D video 293 that represents a musical performance of multiple musicians captured at a series of frames that present different movements associated with different musical instruments, such as violins.

In this example, the video 293 is captured by a stationary camera that did not change its position while capturing the musical performance. The video 293 is reconstructed (as described in FIGS. 2A and 2B) to provide 3D motion data.

At 294, a root-relative 3D skeleton (or pose) of one or more persons from the video 293 is estimated. In some instances, the reconstruction can be associated with a set of the people from the video 293. For example, the estimation can be performed based on a one-stage reconstruction framework that can reconstruct 3D poses for the one or more persons in the video. In some instances, the reconstruction can be done in a single stage to predict the 3D poses relative to a root pelvis joint.

In some implementations, the estimation of the root-relative 3D poses can be performed by regressing meshes for multiple person in the single stage of the video 293. For example, the estimation of the root-relative 3D poses can be performed using the techniques describes in "Yu Sun, Qian Bao, Wu Liu, Yili Fu, Black Michael J., and Tao Mei. 2021. Monocular, One-stage, Regression of Multiple 3D People," which is hereby incorporated by reference. In some implementations, the estimation can be performed by taking as input an image, such as an RGB image presenting people, and generating the root-relative 3D pose for each of the people in the image as output. The output from the estimation can be camera-centered root positions of people captured in the image.

At 295, the root of each 3D skeleton of each of the one or more persons of the video 293 is localized relative to the camera to determine absolute 3D poses. The localized roots can be determined on a camera-centered scene coordinate scale. The roots of each skeleton are localized in a single video scene of the video 293.

In some implementations, camera-centered coordinates of the 3D skeleton can be estimates by approximating an absolute depth from the camera to the respective person by using human height in the physical space and the height in the respective frame (or image). Thus, a root position relative to the camera can be determined for persons captured in videos with cameras that are stationary cameras. For example, the estimation of the camera-centered coordinates of the 3D skeleton can be performed using techniques describes at "Gyeongsik Moon, Juyong Chang, and Kyoung Mu Lee. 2019. Camera Distance-aware Top-down Approach for 3D Multi-person Pose Estimation from a Single RGB Image," which is hereby incorporated by reference.

At 296, each root-relative 3D skeleton of a person is tracked across the multiple frames of the video 293. Each 3D skeleton of a person of the one or more persons in the video 293 can be associated with a corresponding 2D pose tracked during tracking each 3D skeleton across multiple frames of the video 293. The tracking can be performed at a portion of frames from the video 293.

In some instances, each 3D skeleton of each person in the video 293 is associated with a corresponding tracked 2D pose based on the tracking of the person across the multiple frames to reconstruct the 3D motions of the person in the video 293. In some instances, reconstruction of the 3D motion of multiple people from the video 293 can be performed in a similar manner.

In some implementations, to distinguish the motion of multiple people across frames of a single video, each person's 3D skeleton can be tracked with an identifier (ID) to associate the 3D skeleton with the tracked 2D pose across the multiple frames. In some implementations, the tracking can include detecting a plurality of 2D poses of the person across the multiple frames of the video 293 and tracking 2D keypoints of the plurality of 2D poses across the multiple frames with an assigned first ID for that person.

In some instances, tracking the 3D skeleton of a person across multiple frames of the video 293 includes tracking the 2D poses of the person at the multiple frames and performing filtering of 2D keypoints of the plurality of 2D poses across the 3D poses of the 3D skeleton for temporal smoothing of a tracked movement of the person. For example, the temporal smoothing can be performed according to the techniques described at "Géry Casiez, Nicolas Roussel, and Daniel Vogel. 2012. 1€ filter: a simple speed-based low-pass filter for noisy input in interactive systems. In Proceedings of the SIGCHI Conference on Human Factors in Computing Systems. 2527-2530," which is hereby incorporated by reference.

At 288, the reconstructed 3D motions are converted into editable keyframe-based animation data. The animation data is automatically captioned (at 297) with textual image descriptions for classification of the 3D motions to pair a text label with a 3D motion. For example, a motion detected with a person in the 3D video can be described as "playing a violin" and such a label can be used to be paired with the 3D motion data. In some implementations, text snippets can be created based on the video as captions. In some implementations, the text snippets can be created based on a pre-training algorithm for generating text labels from videos. For example, the text snippets can be created substantially similar (or equivalent) to the text description generation described in relation to FIG. 2A. The generated text snippets can be stored in pair with a mapped motion.

At 298, the reconstructed 3D motion data is converted into editable keyframe-based animation data to provide a motion dataset 299. The conversion can be as described in relation to animation data 177 of FIG. 1, the convertor 230 of FIG. 2A, and the operation 280 of FIG. 2B. The conversion of the 3D motion data into keyframe-based animation data can include sampling the particular movement in the video at a predefined frame rate and interpolating missing keyframes and/or removing redundant keyframes to smooth the 3D motion data. The conversion of the 3D motion data can be performed as described at FIG. 2B.

Figure 3:
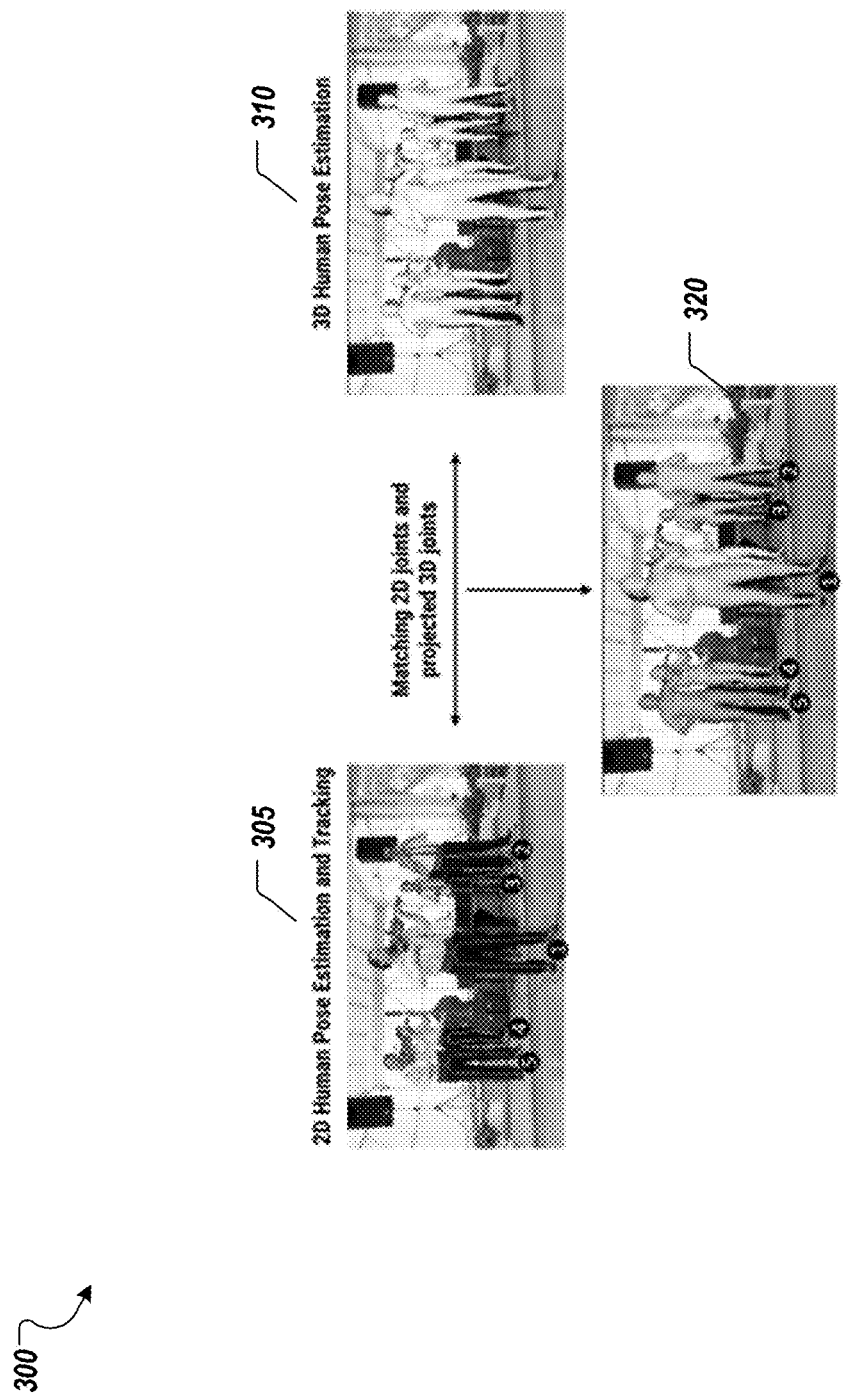
FIG. 3 shows an example of a process to track multiple people in a single video scene of a 2D video to construct 3D motion data from the 2D video in accordance with implementations of the present disclosure.

FIG. 3 shows an example of a process 300 for tracking multiple people in a single video scene of a 2D video to construct 3D motion data from the 2D video in accordance with implementations of the present disclosure. In some implementations, the process 300 can be implemented as part of the reconstruction processes of 3D motion data from 2D videos as described in relation to FIGS. 1, 2A, 2B, and 2C. In some implementations, the process 300 is related to tracking movement of multiple people presented in a 2D video across multiple frames of the 2D video. For example, the process 300 can be performed in relation to the 2D video 293 of FIG. 2B that presented multiple musicians performing at a musical performance. The 2D video includes multiple scenes where multiple people are performing different movements (substantially) in parallel or sequentially. In some implementations, a subset of the people presented on the video may be tracked to reconstruct motion data for that subset of people.

In some instances, a 3D skeleton of a person represents a human pose in a frame of a 2D video. Based on a received 2D video, for example based on 2D video 293 as described in FIG. 2C, 3D skeleton estimates for the human poses of the musical performers can be estimated as described at 294 of FIG. 2B. Root-relative 3D skeletons (or poses) of multiple people in a 2D video are estimated to reconstruct the movements of the people in the 2D video. The estimation of the 3D skeletons of the musicians in a single video scene of the 2D video is presented at 310.

At 305, 2D poses of the 2D skeletons of the people in the scene are tracked across multiple frames of the 2D video. Each 3D skeleton is assigned a respective ID (e.g., 1, 2, 3, etc.).

At 320, an ID from a plurality of IDs is associated with a respective 2D pose of a 3D skeleton of each person from the people in the video at a frame of the video. The ID is associating 2D poses of the 3D skeleton and correspondingly tracks 2D poses of the person at the multiple frames.

In some implementations, 3D joints of a person from the multiple people in the video are projected on the image 320 for each 3D pose of the person to compute an error between the projected 3D joints and detected 2D joints in each frame tracking the 2D pose.

Figure 4:
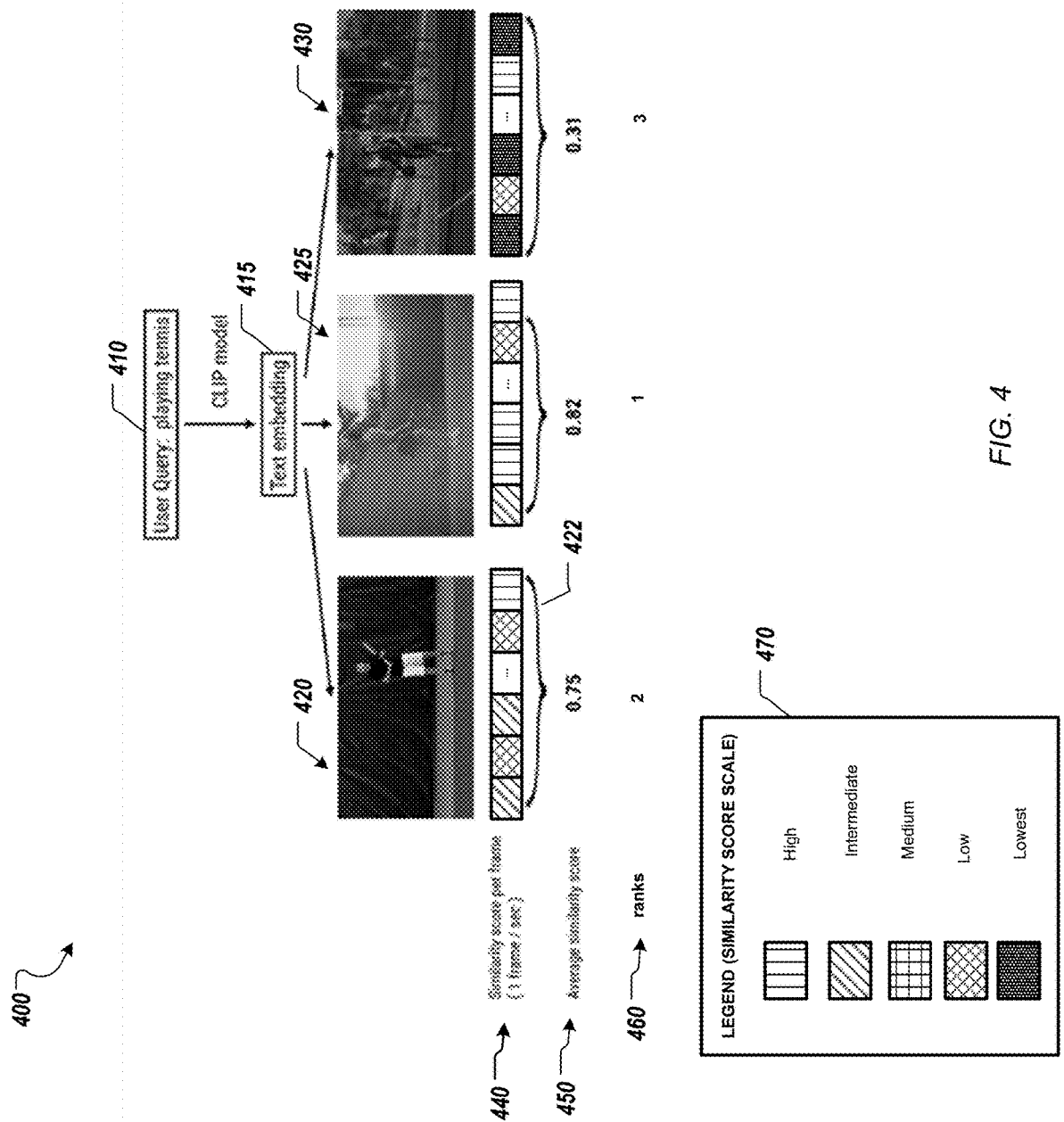
FIG. 4 shows an example of a process to search in a motion database that includes animation data representing movements, which are captioned in an index object to facilitate searching in accordance with implementations of the present disclosure.

FIG. 4 shows an example of a process 400 to search in a motion database that includes animation data representing movements, which are captioned in an index object to facilitate searching in accordance with implementations of the present disclosure.

In some implementations, a user can search for a motion in a motion database. The motion database can be as described at 175 of FIG. 1. The motion database can import the converted animation data based on 2D videos as describe at FIGS. 2A, 2B, 2C, and 3. The motion database can include editable keyframe-based animation data that is mapped to text descriptions and further stores at least a portion of each video that was used to generate the animation data. In some instances, the motion database stores index objects as described in relation to FIG. 2A and can be searched for movements that were recognized at the videos and can provide keyframe-based animation data that is editable and can be applied to animate a character in 3D space.

In some instances, the motion database can be searched through a VR UI as described at FIGS. 1 & 2A in relation to VR UI 116, 122, 245.

In some instances, a user query 410 is received. The query 410 includes a text string "playing tennis" to request animation data for animating a character with movements associated with playing tennis. In some instances, the query 410 can be provided as a voice command including the words "playing tennis." In some examples, the query can be provided as a voice command that complies with a syntax of the command as expected by the VR UI.

Based on the received user query 410, a text embedding 415 is generated to represent a query vector. In some instances, the same techniques used for generating the index object can be used to generate a query vector (as discussed above in relation to FIG. 2A). In some instances, the text embedding 415 can be generated according to the "Contrastive Language-Image Pre-training" also called "CLIP" model as described in "Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al.: Learning transferable visual models from natural language supervision," and discussed above.

Based on the query vector 415, three query results associated with videos that are part of the motion database are determined. The three query results are videos 420, 425, and 430 and show movements that are considered as related to tennis movements based on comparing similarities between the query vector and the feature vector of each of the videos (and the respective animation data). In some instances, based on the query 410, multiple videos can be evaluated and a set of those images can be provided as a result. For example, the top k number of images that are determined to be closest to the query vector 415 can be provided to the user. In some instances, similarity scores between the query vector 415 and feature vectors of videos from the motion database can be computed. For example, the similarity scores 440 per frame are computed for the three query results as presented on FIG. 4. In some instances, further similarity scores can be computed based on comparing the query vector 415 with other videos and their respective feature vectors from the motion database.

In some implementations, similarity scores can be computed on the scale of 0 to 1 to represent closeness between the query vector 415 and each of the feature vectors associated with videos from the motion database. In some implementations, only a set of the videos from the motion database are used to perform the computations for the similarity scores. For example, the videos in the database can be assigned to categories, and the similarity score computations can be limited to videos falling into one or more of the categories. The similarity scores can be computed per frame (at 440) associated with a time stamp. In some instances, the similarity scores can be computed and the computed values are distributed on a scale between 0 to 1. The presented similarity scores 440 on FIG. 4 are defined as bar blocks including multiple sections corresponding to each frame at a given time point, where each section is associated with a value on a predefined scale. The presented similarity scores per frame at 440 are defined based on a scale of 5 similarity scores, where each scale level is presented with a different pattern as illustrated on the legend 470. The legend 470 defines five levels of the scale, namely, high, intermediate, medium, low, and lowest. In some instances, different scales can be defined that are with fewer or more levels.

In some instances, the computed similarity scores can be visualized with bar blocks as shown below each evaluated video 420, 425, 430. For example, the video of search result 420 is associated with bar block 422 representing a visual representation of the computed similarity scores per frame according to the scale defined at legend 470. For example, the presentation of the similarity scores can be according to a color-coded schema. For example, a frame that has a value approximately 1 can be presented with a predefined color, e.g., lighter colors correspond to values closer to 1. In some instances, different scales for presenting the similarity scores can be used to represent differences in the score values per frame. The closer a frame is to the query vector 415, the closer the similarity score value is to the value of 1, and the range of similarities for a given video across the frames of that video can be readily seen in the bar blocks (e.g., a portion of the video that is more similar will have multiple blocks 440 that are close to each other and shown in lighter colors).

In some instances, an average similarity score (as a quantifiable value) can be computed for each video. The average similarity score 450 can be used to rank the results based on their closeness to the user query. As shown on FIG. 4, the average similarity score 450 of query result 420 is 0.75, and the average similarity score of query result 425 is 0.82, therefore the similarity score indicates that the second result 425 is closer to the query request. The third query result 430 has a similarity score of 0.31. By the similarity score itself and the distance from the other scores it can be determined that this result is associated with the lowest probability of matching the user request. As visible on the image of query result 430, the video includes a basketball player, which includes moves that may have similarity to moves in a tennis play but can be further apart from other moves that exactly correspond to the tennis movement.

At 460, a ranking value is allocated to each search result 420, 425, and 430, where the ranking value is ordering the results in a descending order based on their average similarity scores. As such, the highest ranked result is the search result 425 that is with rank equal to "1" and has the highest average similarity score. Further, the search result 420 has a rank value of "2" and is second in the order, and the search result 430 has a rank value of "3" and is the third in the order (with the lowest rank). In some instances, the computed score similarities can be sorted to provide a ranked list of videos including 3D motions matching the search term "playing tennis."

In some instances, based on the computed similarity scores between the query vector and feature vectors from the index object that represent descriptions for movements identified in 2D videos as described through this disclosure, a list of query results can be provided in response to the user query 410. In some instances, the list of query results can include all results, e.g., all the query results 420, 425, and 430. In some instances, the list of provided query results to the user query 410 can be query results that match a query result criteria. For example, the query result criteria can define a threshold value for a similarity score computed between a feature vector of a video from the motion database and the query vector to filter the results list. For example, if the query result criteria defines that results that are provided to the user query 410 are results that have a similarity score above 0.8, then the results that are provided in response to the user query 410 include a single entity, i.e., query result 425 that has a similarity score 0.82 that is above the threshold.

In some implementations, the received user query 410 can be provided as a video rather than a text string. The user query 410 can be a video of a body movement representing a movement to be searched at the motion database. The body movement from the video can be mapped to a text description for a movement, using the systems and techniques described in this disclosure. The text description for the movement can then be used to search the motion database and to determine a corresponding editable keyframe-based motion data in the motion database in a similar manner to the determination of search results when the user query 410 is based on a text string.

In some implementations, the user query 410 can be a motion-based query, where the user performs a body movement and that a video of that body movement can be converted into 3D motion data, using the systems and techniques described in this disclosure. The 3D motion data converted from the video of the body movement of the user can be compared with motion data in the motion database. In some implementations, to increase the speed of such a comparison, a triage search can be performed by excluding movements (corresponding to 2D videos from the motion database) that are not matching (or are no substantially similar or equivalent) the body movement of the user query 410.

In some instances, a direct comparison between the 3D motion (corresponding to the body movements performed by the user) and the reconstructed 3D motion from the motion database can be performed by computing similarity scores with Euclidean (L2) distances for all (or a part) of the joins on the 3D skeleton.

In some instances, the received body movement can be evaluated to determine an associated text description for that movement. For example, the determination of such text description can be performed in a substantially similar manner as the determination of associated text descriptions at 285 of FIG. 2B. For example, the text description can be determined according to the techniques described at "Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al.: Learning transferable visual models from natural language supervision," as previously discussed. In some instances, based on a determined associated text description, the searching can be performed in a similar manner as the searching based on the user query 410.

Figure 5:
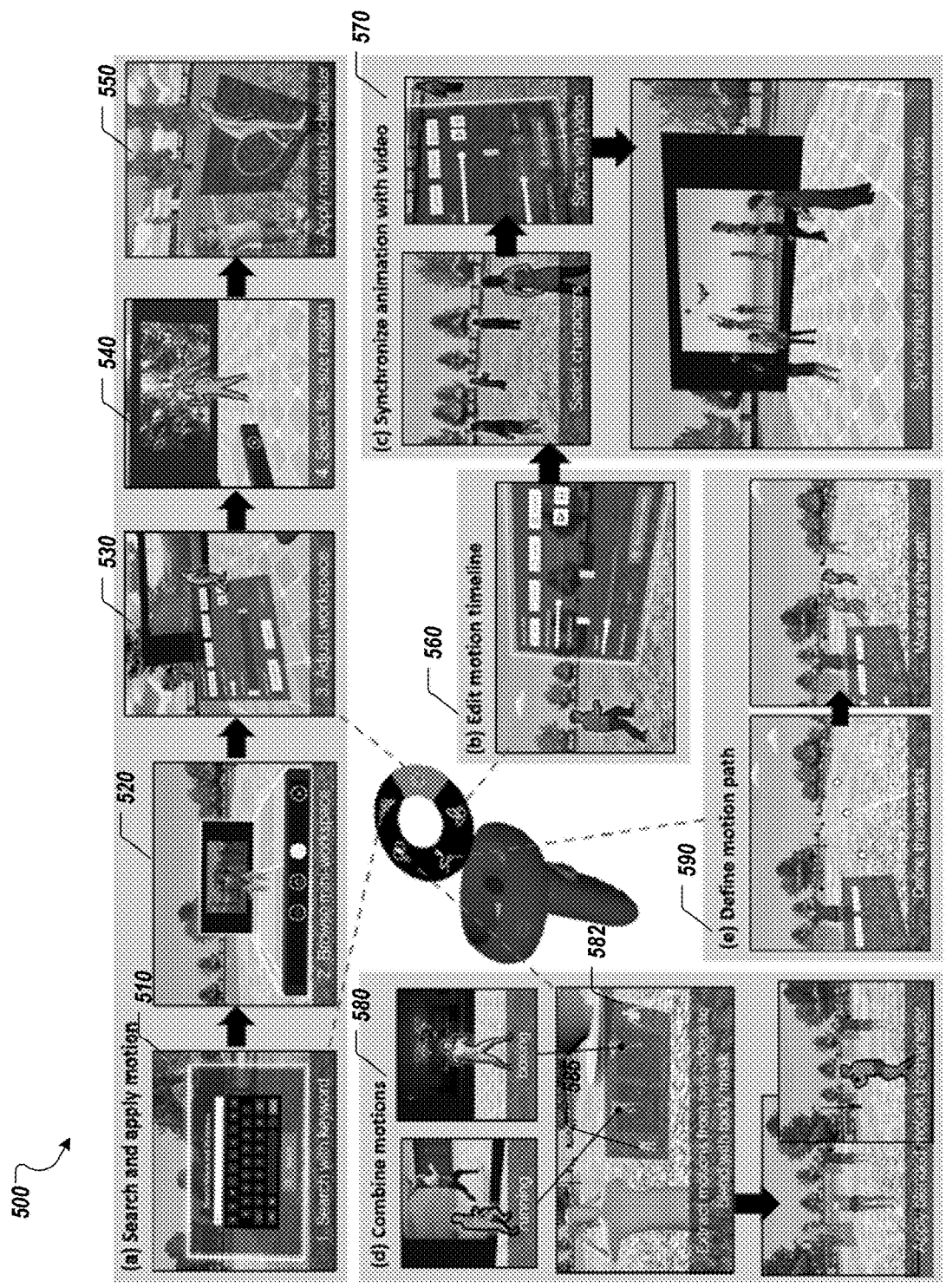
FIG. 5 shows an example of a process that uses a VR interface to search, edit, synchronize, combine motions, and define a motion path when animating characters in a 3D space in accordance with implementations of the present disclosure.

FIG. 5 shows an example of a process 500 executed at user interfaces of a VR interface that is communicatively coupled to a motion database and supports searching, editing, synchronizing, combining motions, and defining a motion path when animating characters in a 3D space in accordance with implementations of the present disclosure. In some implementations, the process 500 can be implemented using a system substantially corresponding to (or equivalent to) system 100 of FIG. 1.

In some instances, a user, such as user 190 of FIG. 1, can work with a VR interface to apply to one or more characters animation data to animate motion of the one or more characters in the 3D space. In some instances, the user is provided with a VR user interface 510 for display and use in prototyping VR character animations using the provided editable keyframe-based motion data at the motion database.

In some implementations, the motion database includes editable keyframe-based animation data, associated text descriptions, and 2D videos correspondingly associated with movements related to the editable keyframe-based animation data. The editable keyframe-based animation data can be substantially similar to the discussed editable keyframe-based animation data generated at FIGS. 1, 2A, 2B, 2C, and 3. In some implementations, the editable keyframe-based animation data has been generated from 3D motion data constructed from the 2D videos and represents the movements in the 2D videos. In some instances, the associated text descriptions have been generated from the two-dimensional videos as described in the present disclosure, for example, in relation to FIG. 2A.

At 510, the VR user interface provides an interface for searching for a movement, for example, based on a text search. The search for a movement can be performed as described in relation to FIG. 4. At 510, the user can type in a keyword or description of a motion with a virtual keyboard.

In some implementations, a search query can be received in the VR environment, and based on the query, a set of editable keyframe-based animation data relevant to the search query can be retrieved from the editable keyframe-based animation data stored at the motion database.

The VR UI can be used in prototyping VR character animations using the set of the editable keyframe-based animation data. The UI can provide functionality to review search results and to execute further searches and display 2D from the motion database that are related to motions determined as relevant to the received search query. In some implementations, the user can select a motion from a corresponding 2D video that is presented at the VR UI, for example, as a result to a search query. The user can select a motion to apply the motion to a character during VR character animation. The motion can be edited during the creation of the animation of the character in the 3D space.

At 520, the VR user interface can provide a 2D video associated with a movement. 520 is showing the extracted motion data on a stage in front of the source video selected by the user. 520 renders a miniature workspace that displays both the video and the reconstructed 3D motion for each subject in the video. The reconstructed motions are synchronized with the video playback and the movements are scaled to fit the mini-workspace. At 520, the user can preview and navigate through different videos presenting movements (or motions) by clicking interacting with the buttons presented on the mini-workspace.

At 530, the user can adjust the workspace where the movement is applied to create the animation based on a selected video (or multiple selected videos). The user can select the motion and place it in the mini-workspace to visualize a life-size motion from different perspectives. The placement of the life-size workspace can be adjusted to avoid occlusion with the environment in the scene.

At 540, the user can select a life-size motion and at 550 can apply the motion to a character by placing the selected motion on the character. In some implementations, implemented logic for animating characters at the system can automatically re-target the motion to the skeleton rig of the selected character as shown at 550. At 560, the user can customize (or edit) the character animated motions. The VR system can provide functionality for trimming the animation based on user input and adjusting the play speed of the motions as applied during the animation process. A user can be provided with functionality to translate and/or rotate the character during animation. The VR UI can provide interfaces with options for selection of a character and adjusting positions based on user provided input. The user input can be provided through a connected device with user interaction buttons and/or motion sensors.

At 570, the user can synchronize multiple movements applied to multiple characters to prototype a customizing of a movement, and applying movements that are at least determined based on one or more of the two-dimensional videos. The customized characters can be synchronized with an original 2D video that was used for generating the animation data that is used for applying the animation. In some instances, the synchronization can be applied when users want to further refine the reconstructed motion as defined at the editable keyframe-based animation data that is used to animate the motion. In some instances, the user can edit the movement to add further details. For example, the user can adjust a facial expression of the person in the video or an object involved in a motion, while such facial expression was not part of the provided motion data applied initially to the character.

The VR interface provides options to synchronize the characters and the motions by selecting the characters that are animated with the motion from the video and invoking synchronization for all the character motions applied.

At 580, the user can send requests to combine motions from different videos, where the videos can be selected based on results provided from searching the motion database (as described at 510). In some instances, the user can combine motions from videos from the motion database and other videos that are provided from another source. For example, a motion from a video from the motion database can be combined with a motion associated with a video recorded by the user, or manually input to the VR UI.

For example, users can create a combat running animation by combining a boxing animation, performed on the upper body of the character, with a running animation on its lower body (see 580). The user can first search for a running motion and define a lower body mask 585. Then the user can search for a boxing motion, define an upper body mask 582, and animate a character with the generated combat running animation.

At 590, the VR UI can provide functionality that supports a user to define a motion path by defining points in the scene to fit a spline curve as the motion path for animating a character to perform a selected movement over the defined motion path. For example, the user can specify the waypoints on the ground to define a motion path for a running animation (see 590 on the left side). After applying the motion path to the character, the user can adjust the speed of the movement and can rotate the character to refine the animation.

Figure 6:
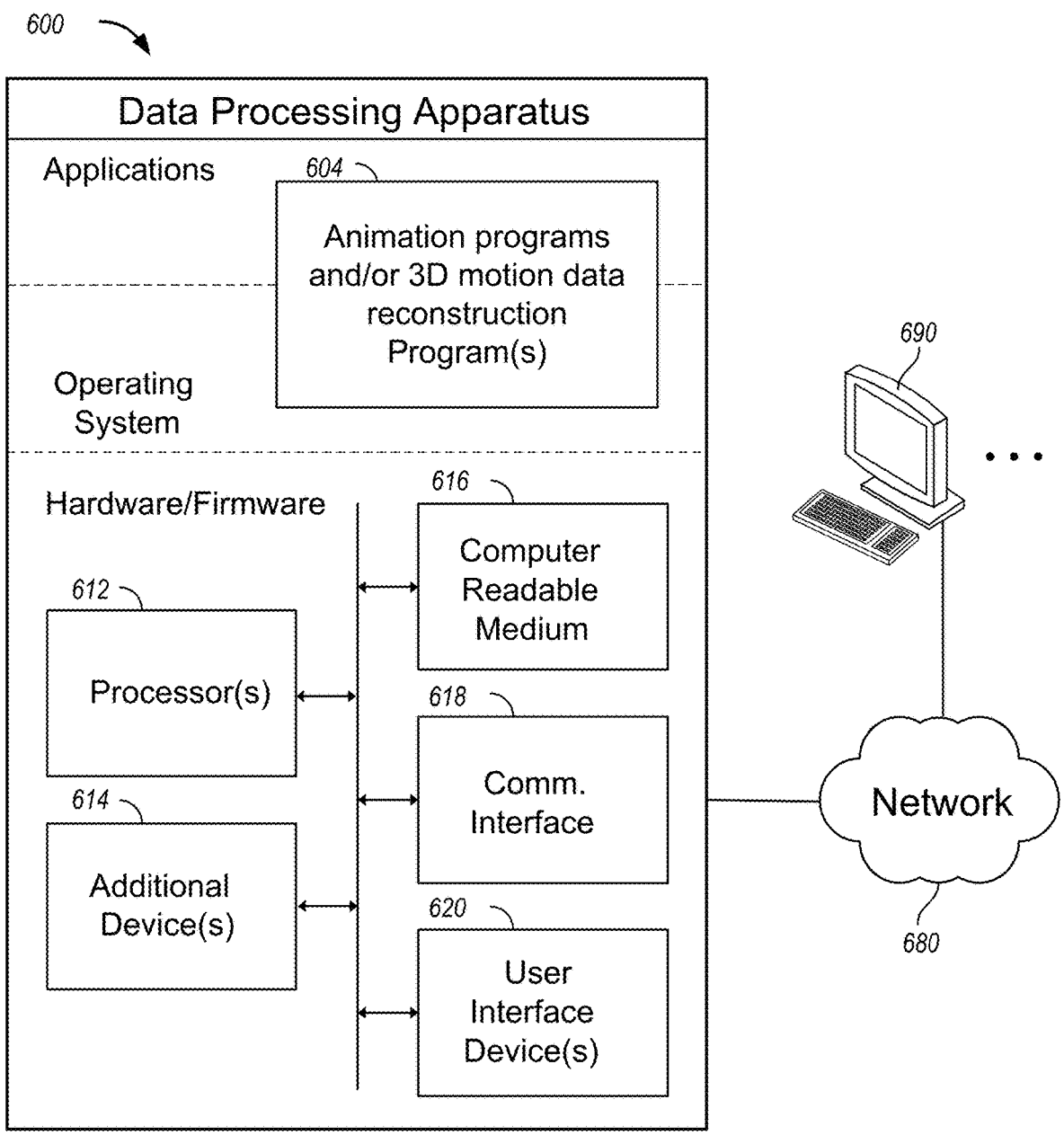
FIG. 6 is a schematic diagram of a data processing system including a data processing apparatus, which can be programmed as a client or as a server.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of animation programs and/or 3D motion data reconstruction program(s) 604 that include VR application for animating characters in 3D space. The VR application 604 can provide a VR interface as described for example at FIGS. 1, 5, and 6, and throughout the present disclosure. Further, the program(s) 604 can implement movie animation production. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses the communication interface 618 to communicate with one or more computers 690, for example, over the network 680. Examples of user interface devices 620 include a display, a camera, a speaker, a microphone, a tactile feedback device, a keyboard, a mouse, and VR and/or AR equipment. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD) device, an organic light emitting diode (OLED) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

EXAMPLES

Although the present application is defined in the attached claims, it should be understood that the present invention can also (additionally or alternatively) be defined in accordance with the following examples:
Providing Editable Keyframe-Based Animation Data to Animate Motion of a Character Example 1: A method comprising:
constructing three-dimensional motion data from two-dimensional videos, the three-dimensional motion data representing movement of people in the two-dimensional videos and including, for each person, a root of a three-dimensional skeleton of the person, wherein the three-dimensional skeleton comprises multiple three-dimensional poses of the person during at least a portion of frames of a video from the two-dimensional videos;
converting the three-dimensional motion data into editable keyframe-based animation data in three-dimensional space; and
providing the editable keyframe-based animation data for applying to a character to animate motion of the character in three-dimensional space.

Example 2. The method of Example 0, wherein the two-dimensional videos comprise user-generated videos posted online, the method comprises associating text descriptions, which are generated from the two-dimensional videos, with the editable keyframe-based animation data, and wherein the providing comprises providing a virtual reality environment with a three-dimensional motion database comprising the editable keyframe-based animation data and the associated text descriptions.

Example 3. The method of Example 1 or 0, wherein the constructing comprises localizing the root of each person of at least a portion of the people with respect to estimated camera coordinates for the two-dimensional videos.

Example 4. The method of any one of the preceding Examples, wherein the constructing comprises associating each three-dimensional pose of each person from at least the portion of the people whose root is localized on a camera-centered scene coordinate scale with a corresponding two-dimensional pose tracked during tracking each three-dimensional skeleton across on multiple frames of a respective video.

Example 5. The method of Example 4, wherein tracking each three-dimensional skeleton of a first person across the multiple frames of the single two-dimensional video comprises:

detecting a plurality of two-dimensional poses of the first person across the multiple frames of the video; and tracking two-dimensional keypoints of the plurality of two-dimensional poses across the multiple frames with an assigned first ID for the first person.

Example 6. The method of Example 5, wherein tracking the three-dimensional skeleton of the first person comprises tracking the two-dimensional poses of the first person at the multiple frames of the video, wherein tracking the two-dimensional poses of the first person comprises:

performing filtering of the two-dimensional keypoints of the plurality of two-dimensional poses across the multiple frames and the three-dimensional poses of the three-dimensional skeleton for temporal smoothing of a tracked movement of the first person, wherein converting the three-dimensional motion data into the editable keyframe-based animation data comprises sampling the movements in the video at a predefined frame rate, and interpolating missing keyframes and/or removing redundant keyframes to smooth the converted three-dimensional motion data.

Example 7. The method of any one of the preceding Examples, wherein constructing the three-dimensional motion data from the two-dimensional videos comprises detecting the movements of the people comprising:

estimating three-dimensional poses of a plurality of the three-dimensional skeletons of a portion of the people comprising two or more people in a single video scene of a single two-dimensional video from the two-dimensional videos;

localizing roots of three-dimensional poses of the portion of the people in the single video scene of the single two-dimensional video;

tracking two-dimensional poses of the three-dimensional skeletons of the portion of the people across multiple frames of the single two-dimensional video, wherein each three-dimensional skeleton is assigned with a respective identifier (ID); and associating an ID from a plurality of IDs with respective three-dimensional poses of a three-dimensional skeleton of each person from the portion of the people and correspondingly tracked two-dimensional poses of the person at the multiple frames.

Example 8. The method of any one of the preceding Examples, comprising:

associating text descriptions, which are generated from the two-dimensional videos, with the movements from the editable keyframe-based animation data; and classifying a movement from the movements into a respective category from a plurality of defined categories.

Example 9. The method of Example 8, wherein associating the text descriptions with the movements from the two-dimensional videos comprises:

representing the text descriptions as feature vectors;

storing respective feature vectors with respective movements detected in the two-dimensional videos to pair a text description with a movement; and generating an index object that encapsulates the feature vectors for use for comparison with query vectors provided during searching for a movement to animate the motion of the character.

Example 10. The method of Example 9, wherein the editable keyframe-based animation data and the generated index object are provided as a motion database for exposing editable keyframe-based motion data to be applied to a character to animate motion in the three-dimensional space, wherein the method comprises:

receiving a search term for querying the motion database;

computing score similarities between a queried vector corresponding to the search term and a plurality of the feature vectors from the index object that represent text descriptions for movements; and sorting the computed score similarities to provide a ranked list of videos including 3D motions matching the search term.

Example 11. The method of Example 10, comprising: providing a virtual reality (VR) user interface for display and use in prototyping VR character animations using the provided editable keyframe-based animation data at the motion database, wherein the VR user interface provides interfaces for searching for a movement, previewing a two-dimensional video associated with a movement, customizing of a movement, and applying movements that are at least determined based on one or more of the two-dimensional videos;

receiving a video of a body movement representing a movement to be searched at the motion database;

mapping the body movement to a text description for a movement at the motion database that is associated with corresponding editable keyframe-based animation data; and receiving a user interaction, at the VR user interface, to manipulate the movement by editing the keyframe-based animation data to animate a character.

Example 12. The method of any one of the preceding Examples, comprising:

receiving a custom motion provided by a user interaction captured at a VR user interface;

processing the custom motion to generate new editable keyframe-based animation data to be used to animate motion of a character in a VR scene; and combining the generated new editable keyframe-based animation data based on the custom motion with one or more movements associated with the provided editable keyframe-based animation data for applying to the character to animate motion of the character in three-dimensional space in the VR scene.

Example 13. The method of Example 11, comprising:

receiving a user interaction to select two or more movements to animate a combined motion of a character in a VR scene, wherein the user interaction identifies mapping between body parts of the character with a respective movement of the two or more movements; and generating a combined movement by combining editable keyframe-based animation data associated with the selected two or more movements according to a customizable body mask that identifies correspondence between a movement and a body part of the character based on the mapping from the received user interaction, wherein different body parts of the character are associated with one of the two or more movements identified at the motion database.

Similar operations and processes as describes in Examples 1 to 13 can be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 13 can also be implemented.

In some implementations, features of the examples 1 to 13 can be combined with features from below presented Examples 1 to 3 related to virtual reality environment for animation of characters.

Virtual Reality Environment for Animation of Characters Based on Searching a Motion Data Including Editable Keyframe-Based Animation Data and Corresponding Two-Dimensional Videos Example 1. A method comprising:
receiving a search query in a virtual reality (VR) environment;
retrieving a set of editable keyframe-based animation data relevant to the search query from a database comprising editable keyframe-based animation data, associated text descriptions, and two-dimensional videos correspondingly associated with movements related to the editable keyframe-based animation data, wherein the editable keyframe-based animation data has been generated from three-dimensional motion data constructed from the two-dimensional videos and represents the movements in the two-dimensional videos, and wherein the editable keyframe-based animation data and the associated text descriptions have been generated from the two-dimensional videos; and
presenting a user interface in the VR environment for use in prototyping VR character animations using the set of the editable keyframe-based animation data of the database, wherein the user interface provides interfaces for searching and displaying two-dimensional videos from the database to select a motion from a corresponding two-dimensional video to be applied to a character during VR character animation, and wherein the user interface allows editing of the selected motion when applied to the character in the VR environment.

Example 2. The method of Example 1, comprising:
receiving input to select the two-dimensional video from the two-dimensional videos associated with the set of editable keyframe-based animation data to select the motion to be applied to the character;
in response to the received input, displaying at least a portion of the two-dimensional video to preview the selected motion; and
applying the selected motion to animate the character by extracting corresponding editable keyframe-based animation data that is applied to the character, thereby animating the character in a three-dimensional space by synchronizing the applied motion to the character with at least the portion of the displayed two-dimensional video.

Example 3. The method of Example 1 or 2, wherein the two-dimensional videos comprise user-generated videos posted online.

Similar operations and processes as describes in Examples 1 to 3 can be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 3 can also be implemented.

In some implementations, features of the examples 1 to 3 can be combined with features from previous presented Examples 1 to 13 related to providing editable keyframe-based animation data to animate motion of a character.

What is claimed is:

1. A method comprising:
constructing three-dimensional motion data from two-dimensional videos, the three-dimensional motion data representing movement of people in the two-dimensional videos and including, for each person, a root of a three-dimensional skeleton of the person, wherein the three-dimensional skeleton comprises multiple three-dimensional poses of the person during at least a portion of frames of a video from the two-dimensional videos;
converting the three-dimensional motion data into editable keyframe-based animation data in three-dimensional space;
providing the editable keyframe-based animation data for applying to a character to animate motion of the character in three-dimensional space; and
associating text descriptions, which are generated from the two-dimensional videos, with the movements from the editable keyframe-based animation data, the associating comprising
representing the text descriptions as feature vectors,
storing respective feature vectors with respective movements detected in the two-dimensional videos to pair a text description with a movement, and
generating an index object that encapsulates the feature vectors for use for comparison with query vectors provided during searching for a movement to animate the motion of the character.

2. The method of claim 1, wherein the two-dimensional videos comprise user-generated videos posted online, and wherein the providing comprises providing a virtual reality environment with a three-dimensional motion database comprising the editable keyframe-based animation data and the associated text descriptions.

3. The method of claim 2, wherein the constructing comprises localizing the root of each person of at least a portion of the people with respect to estimated camera coordinates for the two-dimensional videos.

4. The method of claim 3, wherein the constructing comprises associating each three-dimensional pose of each person from at least the portion of the people whose root is localized on a camera-centered scene coordinate scale with a corresponding two-dimensional pose tracked during tracking each three-dimensional skeleton across on multiple frames of a respective video.

5. The method of claim 4, wherein tracking each three-dimensional skeleton of a first person across the multiple frames of the respective two-dimensional video comprises:
detecting a plurality of two-dimensional poses of the first person across the multiple frames of the video; and
tracking two-dimensional keypoints of the plurality of two-dimensional poses across the multiple frames with an assigned first ID for the first person.

6. The method of claim 5, wherein tracking the three-dimensional skeleton of the first person comprises tracking the two-dimensional poses of the first person at the multiple frames of the video, wherein tracking the two-dimensional poses of the first person comprises:
performing filtering of the two-dimensional keypoints of the plurality of two-dimensional poses across the multiple frames and the three-dimensional poses of the three-dimensional skeleton for temporal smoothing of a tracked movement of the first person, wherein converting the three-dimensional motion data into the editable keyframe-based animation data comprises
  sampling the movements in the video at a predefined frame rate, and
  interpolating missing keyframes and/or removing redundant keyframes to smooth the converted three-dimensional motion data.

7. The method of claim 1, wherein constructing the three-dimensional motion data from the two-dimensional videos comprises detecting the movements of the people comprising:
  estimating three-dimensional poses of a plurality of the three-dimensional skeletons of a portion of the people comprising two or more people in a single video scene of a single two-dimensional video from the two-dimensional videos;
  localizing roots of three-dimensional poses of the portion of the people in the single video scene of the single two-dimensional video;
  tracking two-dimensional poses of the three-dimensional skeletons of the portion of the people across multiple frames of the single two-dimensional video, wherein each three-dimensional skeleton is assigned with a respective identifier (ID); and
  associating an ID from a plurality of IDs with respective three-dimensional poses of a three-dimensional skeleton of each person from the portion of the people and correspondingly tracked two-dimensional poses of the person at the multiple frames.

8. The method of claim 1, comprising:
  classifying a movement from the movements into a respective category from a plurality of defined categories.

9. The method of claim 1, wherein the editable keyframe-based animation data and the generated index object are provided as a motion database for exposing editable keyframe-based motion data to be applied to a character to animate motion in the three-dimensional space, wherein the method comprises:
  receiving a search term for querying the motion database;
  computing score similarities between a queried vector corresponding to the search term and a plurality of the feature vectors from the index object that represent text descriptions for movements; and
  sorting the computed score similarities to provide a ranked list of videos including 3D motions matching the search term.

10. The method of claim 9, comprising:
  providing a virtual reality (VR) user interface for display and use in prototyping VR character animations using the provided editable keyframe-based animation data at the motion database, wherein the VR user interface provides interfaces for searching for a movement, previewing a two-dimensional video associated with a movement, customizing of a movement, and applying movements that are at least determined based on one or more of the two-dimensional videos;
  receiving a video of a body movement representing a movement to be searched at the motion database;
  mapping the body movement to a text description for a movement at the motion database that is associated with corresponding editable keyframe-based animation data; and
  receiving a user interaction, at the VR user interface, to manipulate the movement by editing the keyframe-based animation data to animate a character.

11. The method of claim 10, comprising:
  receiving a custom motion provided by a user interaction captured at the VR user interface;
  processing the custom motion to generate an editable keyframe-based animation data to be used to animate motion of a character in a VR scene; and
  combining the generated editable keyframe-based animation data based on the custom motion with one or more movements identified at the motion database.

12. The method of claim 11, comprising:
  receiving a user interaction to select two or more movements to animate a combined motion of a character in a VR scene, wherein the user interaction identifies mapping between body parts of the character with a respective movement of the two or more movements; and
  generating a combined movement by combining editable keyframe-based animation data associated with the selected two or more movements according to a customizable body mask that identifies correspondence between a movement and a body part of the character based on the mapping from the received user interaction, wherein different body parts of the character are associated with one of the two or more movements identified at the motion database.

13. A method comprising:
  receiving a search query in a virtual reality (VR) environment;
  retrieving a set of editable keyframe-based animation data relevant to the search query from a database comprising editable keyframe-based animation data, associated text descriptions, and two-dimensional videos correspondingly associated with movements related to the editable keyframe-based animation data, wherein the editable keyframe-based animation data has been generated from three-dimensional motion data constructed from the two-dimensional videos and represents the movements in the two-dimensional videos, and wherein the editable keyframe-based animation data and the associated text descriptions have been generated from the two-dimensional videos;
  presenting a user interface in the VR environment for use in prototyping VR character animations using the set of the editable keyframe-based animation data of the database, wherein the user interface provides interfaces for searching and displaying two-dimensional videos from the database to select a motion from a corresponding two-dimensional video to be applied to a character during VR character animation, and wherein the user interface allows editing of the selected motion when applied to the character in the VR environment;
  receiving input to select the two-dimensional video from the two-dimensional videos associated with the set of editable keyframe-based animation data to select the motion to be applied to the character;
  in response to the received input, displaying at least a portion of the two-dimensional video to preview the selected motion; and
  applying the selected motion to animate the character by extracting corresponding editable keyframe-based animation data that is applied to the character, thereby animating the character in a three-dimensional space by synchronizing the applied motion to the character with at least the portion of the displayed two-dimensional video.

14. The method of claim 13, wherein the two-dimensional videos comprise user-generated videos posted online.

15. A system comprising:
a computing device; and
a computer-readable storage device coupled to the computing device and having instructions stored thereon which, when executed by the computing device, cause the computing device to:
  construct three-dimensional motion data from two-dimensional videos, the three-dimensional motion data representing movement of people in the two-dimensional videos and including, for each person, a root of a three-dimensional skeleton of the person, wherein the three-dimensional skeleton comprises multiple three-dimensional poses of the person during at least a portion of frames of a video from the two-dimensional videos;
  convert the three-dimensional motion data into editable keyframe-based animation data in three-dimensional space;
  provide the editable keyframe-based animation data for applying to a character to animate motion of the character in three-dimensional space; and
  associate text descriptions, which have been generated from the two-dimensional videos, with the movements from the editable keyframe-based animation data, wherein the instructions cause the computing device to associate the text descriptions with the movements by causing the computing device to represent the text descriptions as feature vectors,
  store respective feature vectors with respective movements detected in the two-dimensional videos to pair a text description with a movement, and
  generate an index object that encapsulates the feature vectors for use for comparison with query vectors provided during searching for a movement to animate the motion of the character.

16. The system of claim 15, wherein the instructions, when executed by the computing device, cause the computing device to:
  receive a search query;
  retrieve a set of editable keyframe-based animation data relevant to the search query based on searching the provided editable keyframe-based animation data; and
  present a user interface in a VR environment for use in prototyping VR character animations using the set of the editable keyframe-based animation data, wherein the user interface provides interfaces for searching and displaying two-dimensional videos from the two-dimensional videos used for generating the editable keyframe-based animation data to select a motion from a corresponding two-dimensional video to be applied to the character during VR character animation, and wherein the user interface allows editing of the selected motion when applied to the character in the VR environment.

17. The system of claim 16, wherein the instructions, when executed by the computing device, cause the computing device to:
  receive input to select the two-dimensional video from the two-dimensional videos associated with the set of editable keyframe-based animation data to select the motion to be applied to the character;
  in response to the received input, display at least a portion of the two-dimensional video to preview the selected motion; and
  apply the selected motion to animate the character by extracting corresponding editable keyframe-based animation data that is applied to the character, thereby animating the character in a three-dimensional space by synchronizing the applied motion to the character with at least the portion of the displayed two-dimensional video.

18. The system of claim 15, wherein the two-dimensional videos comprise user-generated videos posted online.

* * * * *